(12) United States Patent
Woodward et al.

(10) Patent No.: US 11,442,952 B2
(45) Date of Patent: Sep. 13, 2022

(54) USER INTERFACE FOR COMMERCE ARCHITECTURE

(71) Applicant: salesforce.com, inc., San Francisco, CA (US)

(72) Inventors: David Woodward, Westfield, IN (US); Abhinav Chadda, Emeryville, CA (US); David Hacker, Moraga, CA (US); Steven Ness, Victoria (CA); Matt Lagrotte, Deerfield Beach, FL (US); Jason Moody, Burlington, MA (US); Christopher Bill, Indianapolis, IN (US); Kaustubh Barde, San Francisco, CA (US); Lydia Lodovisi, Indianapolis, IN (US); Sarah Flamion, Newburgh, IN (US); Jamin Hall, Noblesville, IN (US)

(73) Assignee: Salesforce, Inc., San Francisco, CA (US)

( * ) Notice: Subject to any disclaimer, the term of this patent is extended or adjusted under 35 U.S.C. 154(b) by 95 days.

(21) Appl. No.: 16/264,391

(22) Filed: Jan. 31, 2019

(65) Prior Publication Data
US 2020/0097482 A1    Mar. 26, 2020

Related U.S. Application Data

(60) Provisional application No. 62/735,671, filed on Sep. 24, 2018.

(51) Int. Cl.
*G06F 16/25* (2019.01)
*G06F 16/21* (2019.01)
(Continued)

(52) U.S. Cl.
CPC .......... *G06F 16/252* (2019.01); *G06F 3/0484* (2013.01); *G06F 16/211* (2019.01); *G06F 16/288* (2019.01); *G06Q 50/28* (2013.01)

(58) Field of Classification Search
CPC .... G06F 16/252; G06F 16/288; G06F 3/0484; G06F 16/211; G06Q 50/28
See application file for complete search history.

(56) References Cited

U.S. PATENT DOCUMENTS

| 8,560,494 B1 | 10/2013 | Downing et al. |
| 8,805,946 B1 * | 8/2014 | Glommen ............... H04L 67/42 709/206 |

(Continued)

OTHER PUBLICATIONS

Extended European Search Report issued in counterpart European Patent Application No. 19199081.1, dated Feb. 17, 2020 (8 pages).

*Primary Examiner* — Hosain T Alam
*Assistant Examiner* — Chongsuh Park
(74) *Attorney, Agent, or Firm* — Sterne, Kessler, Goldstein & Fox P.L.L.C.

(57) ABSTRACT

Disclosed herein are method, system and device embodiments for setting up a graphical user interface (GUI) for a commerce architecture. An embodiment operates by providing a GUI that displays a first button for adding a first data source and a second button for adding a second data source, the second data source being related to the first data source, receiving a first response via the first button to add the first data source and a second response via the second button to add the second data source, providing a view of a first data schema and a second data schema, wherein the first data schema includes at least one object from the first or the second data source, and wherein the second data schema is a canonical data model, mapping the at least one object of the first data schema to at least one object of the second data (Continued)

schema, and providing a single entity view of the at least one object of the second data schema.

23 Claims, 40 Drawing Sheets

(51) Int. Cl.
*G06F 16/28* (2019.01)
*G06F 3/0484* (2022.01)
*G06Q 50/28* (2012.01)

(56) References Cited

U.S. PATENT DOCUMENTS

| | | | |
|---|---|---|---|
| 8,838,652 B2* | 9/2014 | Jensen | G06F 16/00 |
| | | | 707/803 |
| 9,430,114 B1* | 8/2016 | Dingman | G06F 3/048 |
| 2004/0015783 A1* | 1/2004 | Lennon | G06F 16/242 |
| | | | 715/235 |
| 2005/0055369 A1 | 3/2005 | Gorelik et al. | |
| 2005/0060647 A1* | 3/2005 | Doan | G06F 16/248 |
| | | | 715/205 |
| 2009/0248714 A1* | 10/2009 | Liu | G06F 16/211 |
| 2011/0055289 A1* | 3/2011 | Ennis | G06Q 10/06 |
| | | | 707/805 |
| 2012/0078913 A1 | 3/2012 | Muni et al. | |
| 2016/0034379 A1* | 2/2016 | Shah | G06F 11/3664 |
| | | | 707/602 |
| 2016/0358354 A1 | 12/2016 | Alli et al. | |
| 2017/0286525 A1* | 10/2017 | Li | G06F 16/287 |

* cited by examiner

FIG. 1

Customer 360

Setup
Home
Integration Guides
Data Sources
Data Mapping
> Single Customer View
  Data Preparation — 709
  Matching Rules — 709
  Data Reconciliation Rules — 709
  Customer Update Rules — 709
  Data Stewardship — 709

Next Step: Data Mapping — 702
Great! Now that you have added data sources, the next step is to map your customer data in each to the canonical customer data model. This will allow different data sources to share information.

Map Data — 713

Data Sources — 703
All Data Sources — 707
6 items Sorted by Type

Add Data Source — 711

| Name | Type | Domain | Production |
|---|---|---|---|
| Crocs US | Commerce Cloud | https://crocs.com | True |
| Crocs North America | Service Cloud | https://crocs-na.my.salesforce.com | True |
| Crocs Canada | Service Cloud | https://crocs-ca.my.salesforce.com | True |
| Crocs Latin America | Service Cloud | https://crocs-la.my.salesforce.com | True |
| Crocs Sales | Sales Cloud | https://crocs.my.salesforce.com | True |
| Crocs Marketing | Marketing Cloud | https://mc.exacttarget.com | True |

Customer 360

- Setup
- Home
- Integration Guides
- Data Sources
- Data Mapping
  - > Single Customer View
  - Data Preparation
  - Matching Rules
  - Data Reconciliation Rules
  - Customer Update Rules
  - Data Stewardship

*Einstein Data Mapping Recommendations* — 1135
We have gone ahead and done a bunch of mapping for you based on standard attribute definitions. We have detected that you have additional custom fields which you might also want to map.

View Recommendations

Data Mapping — 1111
Showing all Canonical Attributes and Entities from Customer

CANONICAL DATA MODEL — 1115

Consumer ▼

| | 1125 |
|---|---|
| > Individual | 10 |
| ⊙ Reward Score | |
| ⊙ Source Guide | |
| ⊙ Create Date | |
| ⊙ First Name | |
| ⊙ Last Name | |
| ⊙ Update Date | |
| ⊙ Date of Birth | |
| ⊙ Salutation | |
| ⊙ Suffix | |
| ⊙ Second Name | |

CANONICAL DETAILS — 1127

Search for attributes  [Save]

Individual
Below are all the attributes for the selected object. You can add additional ones here.

Find Field — 1129

| Visi... | Attribute Label — 1131 | Data Type — 1133 | Description |
|---|---|---|---|
| ✓ | Reward Score | Integer (5) | |
| ☐ | Block Geolocation Tracking | Boolean | |
| ✓ | Create Date | Date / Time | |
| ✓ | Date of Birth | Date / Time | |
| ☐ | Do Not Market Update Date | Boolean | |
| ☐ | Do Not Process Update Date | Boolean | |
| ☐ | Do Not Profile Update Date | Boolean | |
| ☐ | Do Not Track Location Update Date | Boolean | |
| ☐ | Do Not Track Update Date | Boolean | |
| | Do Not Process | Boolean | |

Customer 360

- Setup
- Home
- Integration Guides
- Data Sources
- Data Mapping
  - Single Customer View
  - Data Preparation
  - Matching Rules
  - Data Reconciliation Rules
  - Customer Update Rules
  - Data Stewardship

Data Mapping
Showing all Canonical Attributes and Entities from Customer

*Einstein Data Mapping Recommendations* — 1411
We have gone ahead and done a bunch of mapping for you based on standard attribute definitions. We have detected that you have additional custom fields which you might also want to map.

[View Recommendations] [X]

| DATA SOURCE SCHEMA 1407 | TRANSFORMATION 1409 | CANONICAL DATA MODEL |
|---|---|---|
| Crocs Service US  1413 | [Search for attributes] | Consumer  1415 |

[Save]

✓ Type mismatch resolved — 1435

Transformation Rule

[↶ ↷ ⊟ ✕ </>  ▶]

```
CASE (reward_level__c,
    IF (reward_level__c == "Silver"), 25,
    IF (reward_level__c == "Gold"), 50,
    IF (reward_level__c == "Platinum"), 100,
    ELSE, 0
)
```
1436

Transformation Preview 1439

| RECORD ID | SOURCE DATA | TRANSFORMED DATA |
|---|---|---|
| 89207 | Silver | 25 |
| 80184 | Platinum | 100 |
| 08515 | Platinum | 100 |
| 45236 | Silver | 25 |
| 19628 | Silver | 25 |
| 02355 | Gold | 50 |
| 22895 | Silver | 25 |
| 86351 | Silver | 25 |
| 04023 | Platinum | 100 |

< 10 of 300 Samples >

| CROCS SERVICE US | CANONICAL |
|---|---|
| Reward Level | Reward Score |
| String (255) | Integer (5) |
| Required | Required |
| Standard Field | Standard Field |

Customer 360

- Setup
- Home
- Integration Guides
- Data Sources
- Data Mapping
- Single Customer View
  - Data Preparation
  - Matching Rules
  - Data Reconciliation Rules
  - Customer Update Rules
  - Data Stewardship

Data Preparation

Set Default Country — 1703

This data operation requires a default country value if the source record is missing the value for country.

| Data Source — 1707 | Default Country for Address — 1709 |
|---|---|
| Crocs US    1711 | United States of America ▸ |
| NTO North America | Select Country ▸  — 1713 |
| NTO Europe | Canada |
| NTO Latin America | United States of America |
| NTO Sales | Select Country ▸ |
| NTO Marketing | Select Country ▸ |

Cancel    Save & Activate — 1715

Customer 360

Setup
Home
Integration Guides
Data Sources — 1803
Data Mapping
∨ Single Customer View
   Data Preparation
   Matching Rules
   Data Reconciliation Rules
   Customer Update Rules
   Data Stewardship

Data Preparation
Enhance your data quality to ensure the best customer profile consolidation by completing the items — 1831
Marked Setup Required.

SINGLE CUST
Data Prepa  ⊘ Default country values were set for Phone Cleansing and Normalization  ☒

8 items • Sorted by Label — 1815

| DATA OPERATIONS — 1807 | NUMBER OF ATTRIBUTES — 1809 | STATUS — 1811 | LAST MODIFIED — 1813 |
|---|---|---|---|
| Address Cleansing and Normalization | 8 — 1819 | • Active | 09/18/2018, 1:01 PM |
| Email Cleansing and Normalization | 1 | • Active | 09/18/2018, 1:01 PM |
| Phone Cleansing and Normalization — 1823 | 3 — 1827 | • Active | 09/18/2018, 1:01 PM |
| Whitespace Removal – First Name | 1 | • Active | 09/18/2018, 1:01 PM |
| Whitespace Removal – Middle Name | 1 | • Active | 09/18/2018, 1:01 PM |
| Whitespace Removal – Last Name | 1 | • Active | 09/18/2018, 1:01 PM |
| Whitespace Removal – Secondary Last Name | 1 | • Active | 09/18/2018, 1:01 PM |
| Whitespace Removal – Social Handle | 1 | • Active | 09/18/2018, 1:01 PM |

Customer 360

Edit Matching Rule — 2203

Match Preview — 2209

< 5 of 30 Samples >  — 2223

| SAMPLE RECORD | POTENTIAL MATCH RECORD | FIELD MATCH | MATCH RESULTS |
|---|---|---|---|
| First Name: Joe<br>Last Name: Smith — 2215<br>Phone: (303) 603-4211 | First Name: Joseph<br>Last Name: Smith<br>Phone: (303) 603-4211 | • Fuzzy Match<br>• Exact Match — 2217<br>• Exact Match | • Matched — 2221 |
| | First Name: Joseph<br>Last Name: Smath<br>Phone: (317) 318-4247 | • Fuzzy Match<br>• No Exact Match<br>• Exact Match | • Not Matched — 2219 |
| | First Name: Joe<br>Last Name: Smith<br>Phone: (317) 318-4247 | | |
| | First Name: Dave<br>Last Name: Smith<br>Phone: (317) 332-6438 | • Fuzzy Match<br>• Exact Match<br>• No Exact Match | • Not Matched |
| | First Name: Lynn<br>Last Name: Vernity<br>Phone: (707) 738-5727 | • Fuzzy Match<br>• Exact Match<br>• No Exact Match | • Not Matched |
| | First Name: Vicky<br>Last Name: Souzer<br>Phone: (235) 813-2134 | • Fuzzy Match<br>• Exact Match<br>• Exact Match | • Matched |

Additional sample records:
- First Name: Lynne, Last Name: Vernity, Phone: (650) 812-3327
- First Name: Victoria, Last Name: Souzer, Phone: (235) 813-2134

Rule Information — 2207

Name
Name with Exact Phone

Description
Fuzzy First Name, Exact Last Name, Exact Phone — 2213

Matching Criteria

Take Action When
All Conditions are Met

Criteria
Individual.Firstname equals Fuzzy First Name
Individual.LastName equals Exact Match
ContactPointPhone.PhoneNumber equals Exact Match

[Cancel]  [Save & Activate]

FIG. 22

Data Reconciliation

Configure a reconciliation rule for any attribute that can only have one value. The reconciliation rules determine which value to use when there are multiple values available from different data sources.

SINGLE CUSTOMER VIEW
Data Reconciliation Rules — 2403
9 items • Sorted by Attribute Name — 2407

New Rule — 2403

| ATTRIBUTE NAME — 2419 | ENTITY — 2409 | DATA TYPE — 2411 | ATTRIBUTE TYPE — 2413 | RECONCILIATION RULE — 2415 | LAST MODIFIED — 2417 |
|---|---|---|---|---|---|
| First Name | Individual | Text | Standard | Last Updated | 09/18/2018, 1:01 PM |
| Full Name | Individual | Text | Standard | Last Updated | 09/18/2018, 1:01 PM |
| Last Name | Individual | Text | Standard | Frequency | 09/18/2018, 1:01 PM |
| Middle Name | Individual | Text | Standard | Last Updated | 09/18/2018, 1:01 PM |
| Name Suffix | Individual | Text | Standard | Last Updated | 09/18/2018, 1:01 PM |
| Nick Name | Individual | Integer | Standard | Tenant Priority | 09/18/2018, 1:01 PM |
| Reward Score | Individual | Text | Custom | Tenant Priority | 09/18/2018, 1:01 PM |
| Salutation Name | Individual | Text | Standard | Frequency | 09/18/2018, 1:01 PM |
| Secondary Last Name | Individual | Text | Standard | Last Update | 09/18/2018, 1:01 PM |

Customer 360

2405:
- Setup
- Home
- Integration Guides
- Data Sources
- Data Mapping
- ˅ Single Customer View
  - Data Preparation
  - Matching Rules
  - Data Reconciliation Rules
  - Customer Update Rules
  - Data Stewardship

Customer 360

- Setup
- Home
- Integration Guides
- Data Sources
- Data Mapping
- ∨ Single Customer View
  - Data Preparation
  - Matching Rules
  - Data Reconciliation Rules
  - Customer Update Rules
- Data Stewardship

Single Customer View > Data Reconciliation Rules — 2503
First Name

| Description | Entity | Attribute Type | Data Type |
|---|---|---|---|
| First Name | Individual | Standard | Text |

— 2507

DETAILS SOURCE MAPPINGS — 2509

Active Rule — 2511
Last Updated

Description — 2513  —2521  Primary Tie Breaker — 2515  Secondary Tie Breaker — 2517  Last Modified — 2519
The last updated value is reconciled.  Source Priority  Frequency  09/18/2018, 1:01 PM  [Edit] — 2535

∨ View Tie Breaker Rule — 2523 — 2533

| PRIORITY | DATA SOURCE — 2525 | CLOUD NAME | SOURCE OBJECT — 2527 | PRIMARY TIE BREAKER — 2529 | SECONDARY TIE BREAKER — 2531 |
|---|---|---|---|---|---|
| 1 | Crocs Global | Commerce Cloud | Customer Profile | Frequency | Last Updated |
| 2 | Crocs Global | Commerce Cloud | Address | Last Updated | N/A |
| 3 | Crocs Global | Commerce Cloud | Order | Last Updated | N/A |
| 4 | Crocs USA | Commerce Cloud | Customer Profile | Frequency | Last Updated |
| 5 | Crocs USA | Commerce Cloud | Address | Last Updated | N/A |
| 6 | Crocs USA | Commerce Cloud | Order | Last Updated | N/A |
| 7 | NTO Service Desk Global | Service Cloud | Person Account | Frequency | Last Updated |

FIG. 26

Customer 360

- Setup
- Home
- Integration Guides
- Data Sources
- Data Mapping
- Single Customer View
  - Data Preparation
  - Matching Rules
  - Data Reconciliation Rules
  - Customer Update Rules
- Data Stewardship

Single Customer View > First Name  2703

ⓘ Last Updated was set as the data reconciliation rule.

| Description | Entity | Attribute Type | Data Type |
|---|---|---|---|
| First Name | Individual | Standard | Text |

2704

DETAILS — SOURCE MAPPINGS

Active Rule  2707  2711
Last Updated

Edit    2719

Last Modified
09/18/2018, 1:01 PM

Description
The last updated value is reconciled.

Primary Tie Breaker: Source Priority
Secondary Tie Breaker: Frequency

∨ View Tie Breaker Rule

| PRIORITY | DATA SOURCE | CLOUD NAME | SOURCE OBJECT | PRIMARY TIE BREAKER | SECONDARY TIE BREAKER |
|---|---|---|---|---|---|
| 1 | Crocs Global | Commerce Cloud | Customer Profile | Frequency | Last Updated |
| 2 | Crocs Global | Commerce Cloud | Address | Last Updated | N/A |
| 3 | Crocs Global | Commerce Cloud | Order | Last Updated | N/A |
| 4 | Crocs USA | Commerce Cloud | Customer Profile | Frequency | Last Updated |
| 5 | Crocs USA | Commerce Cloud | Address | Last Updated | N/A |
| 6 | Crocs USA | Commerce Cloud | Order | Last Updated | N/A |
| 7 | NTO Service Desk Global | Service Cloud | Person Account | Frequency | Last Updated |

FIG. 27

Customer 360

Setup
Home — 2813
Integration Guides
Data Sources
Data Mapping
∨ Single Customer View
   Data Preparation — 2811
   Matching Rules — 2825
   Data Reconciliation Rules
   Customer Update Rules
   Data Stewardship

Data Stewardship — 2802
Improve your data quality based on customer interactions and intelligent recommendations. Requests for data improvement are sorted by priority.

Data Stewardship — 2803
REQUEST QUEUE — 2807  SEARCH — 2809

5 Request Sorted by Relevance

| PRIORITY | REQUEST TYPE | REQUESTOR TYPE | NAME | STATUS | REQUEST DATE | REQUEST ID |
|---|---|---|---|---|---|---|
| High | Privacy Delete | Andy Wilson | Farrah Nichols | New | 09/18/2018 | 62428 |
| High | Profile Merge | Andy Wilson | Samantha Smith-Jones | New | 09/15/2018 | 27253 |
| Medium | Match Candidate | System | Chad Rogers | New | 09/17/2018 | 19073 |
| Low | Match Candidate | System | Barry Moore | New | 09/17/2018 | 87764 |
| Low | Match Candidate | System | Jane Craigs | New | 09/16/2018 | 90637 |

Customer 360

- Setup
- Home
- Integration Guides
- Data Sources
- Data Mapping
- ∨ Single Customer View
  - Data Preparation
  - Matching Rules
  - Data Reconciliation Rules
  - Customer Update Rules
  - Data Stewardship

---

Request Queue > Profile Merge
Samantha Smith-Jones — 3003

| Requested By | Requested From | Priority | Status | Note from Requestor |
|---|---|---|---|---|
| Andy Wilson | ⊙ NTO North America | High | New | Sam's Reward Level is not correct due to her two profiles. |

Records: 2     [Merge Records] — 3007

The following records have been flagged for merge.

| ID — 3009 | NAME — 3011 | EMAIL — 3013 | PHONE — 3015 | ADDRESS — 3017 |
|---|---|---|---|---|
| 00330000011DhuJ | Samantha Smith-Jones | Home: ssmith@gmail.com<br>Work: sam@mystyle.com | Home: +14089313560<br>Mobile: +15407531122<br>Work: 442031477600<br>Other: 4480072533333 | Billing: 221B Baker St Marlyebone, Lond<br>Shipping: 1500 California Ave, Apt. 2, S |
| 00330000011Ddio | Samantha Jones | Home: s.smith@outlook.com | Home: +14089313560 | Billing: 221B Baker St Marlyebone, Lond |

FIG. 32

USER INTERFACE FOR COMMERCE ARCHITECTURE

CROSS REFERENCE TO RELATED APPLICATIONS

This application claims the benefit of U.S. Provisional Patent Application No. 62/735,671 filed on Sep. 24, 2018, which is incorporated by reference in its entirety.

BACKGROUND

Companies have access to more data about consumers of their products and services than ever before. An objective of a customer relationship management (CRM) system is to efficiently manage and be able to easily access and share this data at all levels of service within a supply chain. However, conventional database or CRM systems are not able to integrate customer data from disparate, disconnected sources and create a master record for a consumer. Conventional systems are also challenged with determining where to get data from for either executing queries, reading, or writing data in a multi-tenant system. Another issue with conventional systems is that of data provenance i.e. determining one or more sources of data in a record. Furthermore, conventional systems have struggled with providing audit logs for data. Data provenance and audit logs are essential for complying with privacy laws. Conventional systems also face the issue of integrating data with different time scales, accessing data from different sources, comparing the data, and reconciling it.

Typical commerce/marketing systems require administrators to produce code to convert high volume, low quality consumer data into lower volume, higher quality data. This process can be time consuming, expensive, and error prone. When a customer leaves items in an online checkout cart i.e. abandons the cart, administrators have to write specific code to parse through large amounts of data to track such events and generate follow-up emails to the consumer. Furthermore, because data comes from disparate sources that have their own Application Programming Interface (API), conventionally administrators would have to learn the API for each system to program a query to interface with different systems and retrieve the data. In addition, most commerce architecture systems require system administrators to program a lot of the functionality instead of providing point-and-click user interfaces. Embodiments presented herein provide solutions for at least these problems amongst others.

BRIEF DESCRIPTION OF THE DRAWINGS

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
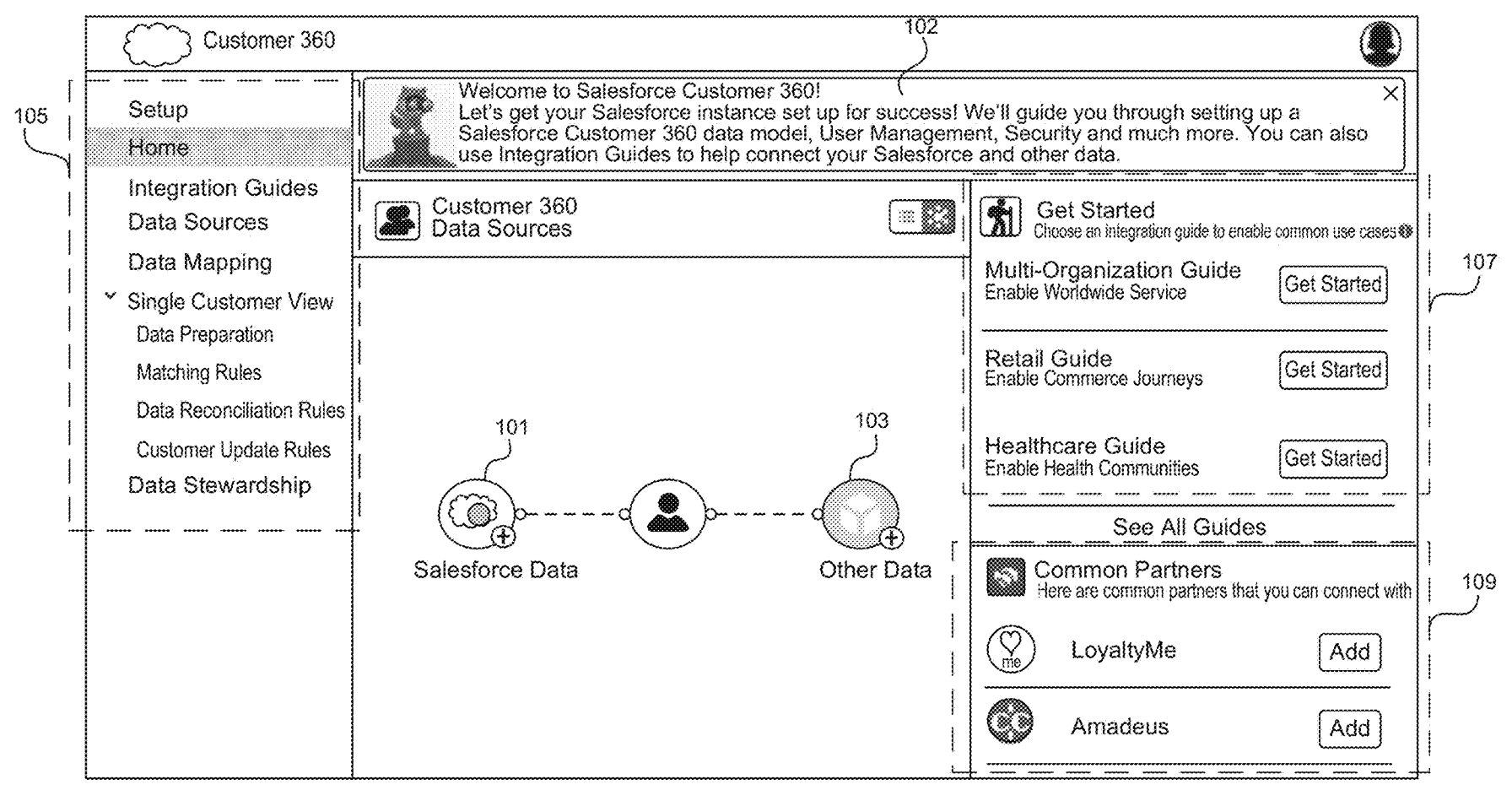

FIG. 1 illustrates a Graphical User Interface (GUI) screenshot of Salesforce Customer 360 home page, according to some embodiments.

FIG. 7 illustrates a Commerce Architecture GUI screenshot of connected data sources for an exemplary customer, according to some embodiments.

FIG. 11 illustrates a Commerce Architecture GUI screenshot of the addition of one attribute to the expanded entity of canonical data model, according to some embodiments.

FIG. 14 illustrates a Commerce Architecture GUI screenshot of transformation rule setup to solve type mismatch between the field under data source schema to the corresponding attribute under canonical data model, according to some embodiments.

Figure 16:
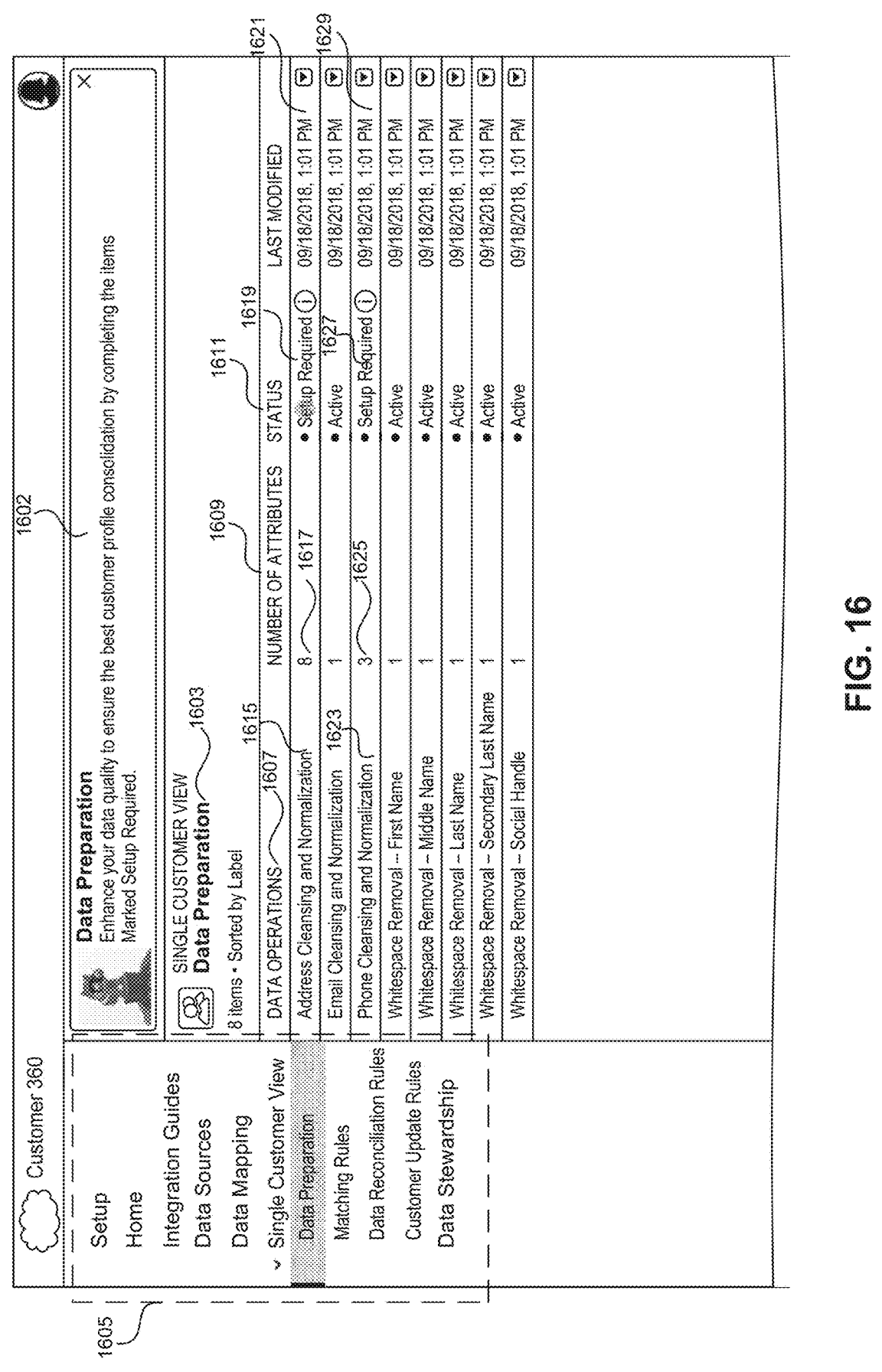

FIG. 16 illustrates a Commerce Architecture GUI screenshot of data preparation for single entity view, according to some embodiments.

FIG. 17 illustrates a Commerce Architecture GUI screenshot of setting up an exemplary default value for data preparation, according to some embodiments.

FIG. 18 illustrates a Commerce Architecture GUI screenshot of completing required setup for data preparation, according to some embodiments.

FIG. 22 illustrates a Commerce Architecture GUI screenshot of match preview after editing of the matching rule, according to some embodiments.

FIG. 24 illustrates a Commerce Architecture GUI screenshot of data reconciliation rules for single entity view, according to some embodiments.

FIG. 25 illustrates a Commerce Architecture GUI screenshot of the data reconciliation rule for one exemplary attribute, according to some embodiments.

FIG. 26 illustrates a Commerce Architecture GUI screenshot of the editing of the data reconciliation rule for the exemplary attribute, according to some embodiments.

FIG. 27 illustrates a Commerce Architecture GUI screenshot after the editing of the data reconciliation rule for the exemplary attribute, according to some embodiments.

FIG. 28 illustrates a Commerce Architecture GUI screenshot of data stewardship, according to some embodiments.

FIG. 30 illustrates a Commerce Architecture GUI screenshot of the details of the exemplary request for data stewardship, according to some embodiments.

FIG. 32 illustrates a Commerce Architecture GUI screenshot of the search result of data stewardship, according to some embodiments.

Figure 2:
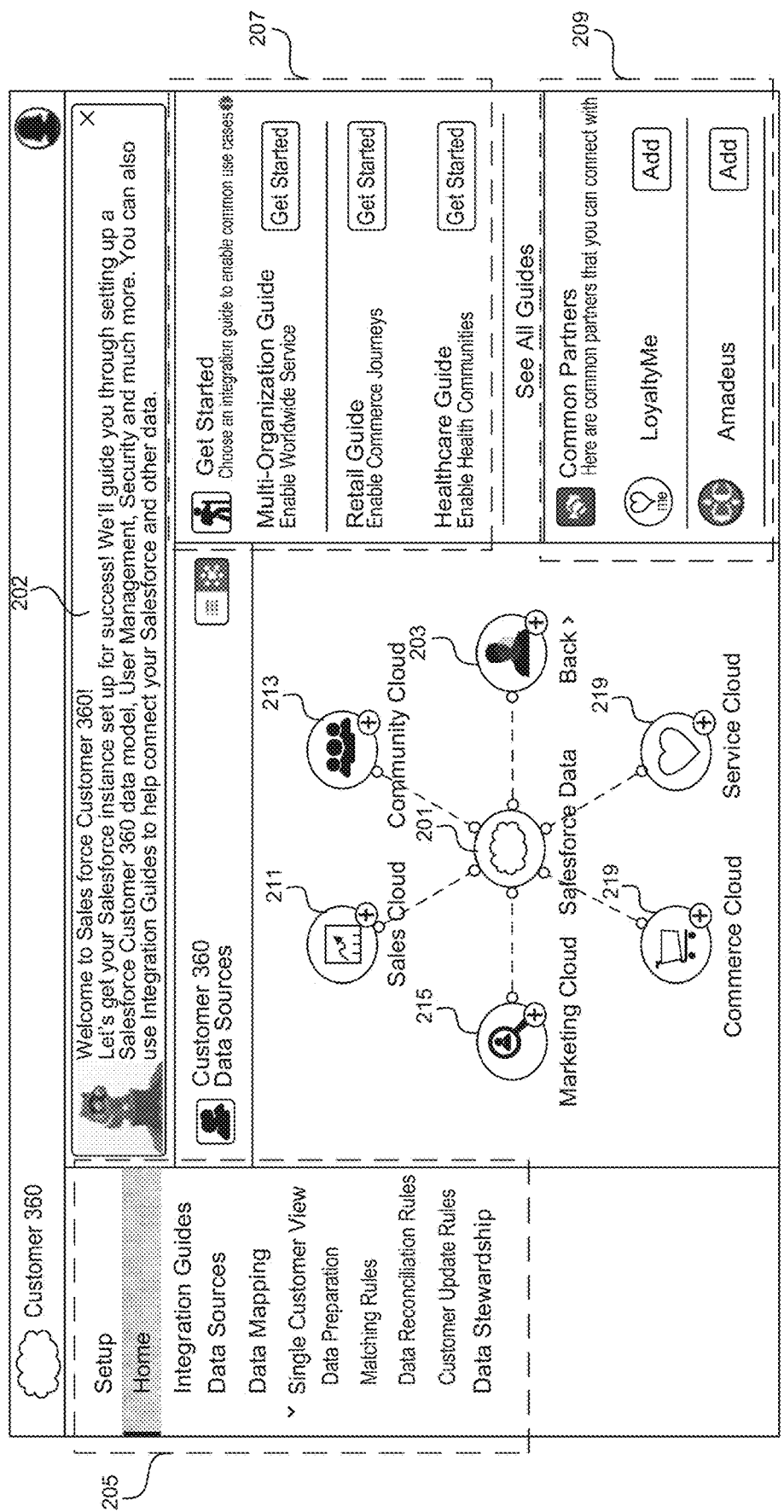
FIG. 2 illustrates a Salesforce Customer 360 GUI screenshot of connecting with Salesforce data sources, according to some embodiments.

The features and advantages of the present embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Provided herein are method, system, and/or computer program product embodiments, and/or combinations and sub-combinations thereof, for commerce architecture user interface.

Using the Commerce Architecture graphical user interface (GUI) disclosed herein, a user can connect various data sources, including third party data sources through point-and-connect APIs, map consumer data from various data sources to master records of a canonical data model, and define matching rules and data reconciliation rules for single entity view through point-and-click user interfaces and out-of-box functions. And the data stewardship can provide data management as well as query results of the master record of the consumer data in the canonical data model in response to a customer request or a system recommendation. FIG. 1-38 provides the steps of setting up Commerce Architecture GUI, according to some embodiments.

In this specification, "canonical" refers to a standard form or a standard way of representing an order or structure of data, such as for an object or list of objects in software. Herein, "canonical" may be used to describe a canonical data schema generically or more specifically describe a canonical data model that provides a template for other data schemas. In contrast, "acanonical" refers to a representation such that an order or structure of data has a unique, or non-standard, representation, such as for a tenant-specific data source schema. And the following terms can be used to describe the elements in the data schemas:

Data source: a business organization, such as a department, subsidiary, or vendor, or generally a tenant, that manages a database of customer information; a specific database of customer information from a tenant;

Tenant: a business organization with a data center managed in a CRM system.

Schema: a representation of data structure and/or database organization), for example, in the form of a model; and Object: a data construct or record that provides a description of something that may be used by a computer in a CAM system, such as a category of customer data, specifically contact information or account information, for example; objects may contain several fields of subcategories of information;

Field: a part of a data record, such as an attribute of a canonical entity or a section of data within a data source object, that serves as a placeholder for information;

Attribute: a piece of information that determines the properties or content of a field, such as within an entity of a canonical schema;

Entity: a data record containing fields of related or similar attributes;

Group: a plurality of entities in a connected relationship, such as those being located close together and/or classed together;

FIG. 1 illustrates a Graphical User interface (GUI) screenshot of Salesforce Customer 360 in an empty state, that is, at the start of the process to set up Commerce Architecture, according to some embodiments. In the empty state, the user can select data sources to connect, for example, Salesforce Data 101, or other Data 103 which can be third part data, such as MuleSoft. The Setup 105 can include the setup steps of Commerce Architecture with current setup step highlighted, for example, Home, Integration Guides, Data Sources, Data Mapping, Data Stewardship, and Single entity/customer view including Data Preparation, Matching Rules, Data Reconciliation rules, and Customer Update Rules. The information header 102 at the top of the GUI can present message related to the current setup step, for example, at the Home step, a "Welcome to Salesforce Customer 360" message could be presented to guide through the setup. In Get Started box 107, integration guides to enable common use cases can be included, such as Enable Worldwide Service, Enable Commerce Journeys, and Enable Health Communities. And one click on the corresponding guide could quickly start the setup of the service. Common Partners 109 can display common partners that can be connected with, for example LoyaltyMe and Amadeus. The GUI of Salesforce Customer 360 can provide customers with point-and-click user interfaces for most commerce architecture systems, which conventional systems require administrators to program a lot to set up the functionality.

FIG. 2 illustrates a Salesforce Customer 360 GUI screenshot of connecting with Salesforce data sources, according to some embodiments. In the example of FIG. 2, Salesforce Data 201 can integrate data from different sources, such as Sales Cloud 211, Community Cloud 213, Marketing Cloud 215, Commerce Cloud 217, and Service Cloud 219. After clicking on Back button 203, the GUI can return to the Home screen as shown in FIG. 1.

Integration Guides

Figure 3:
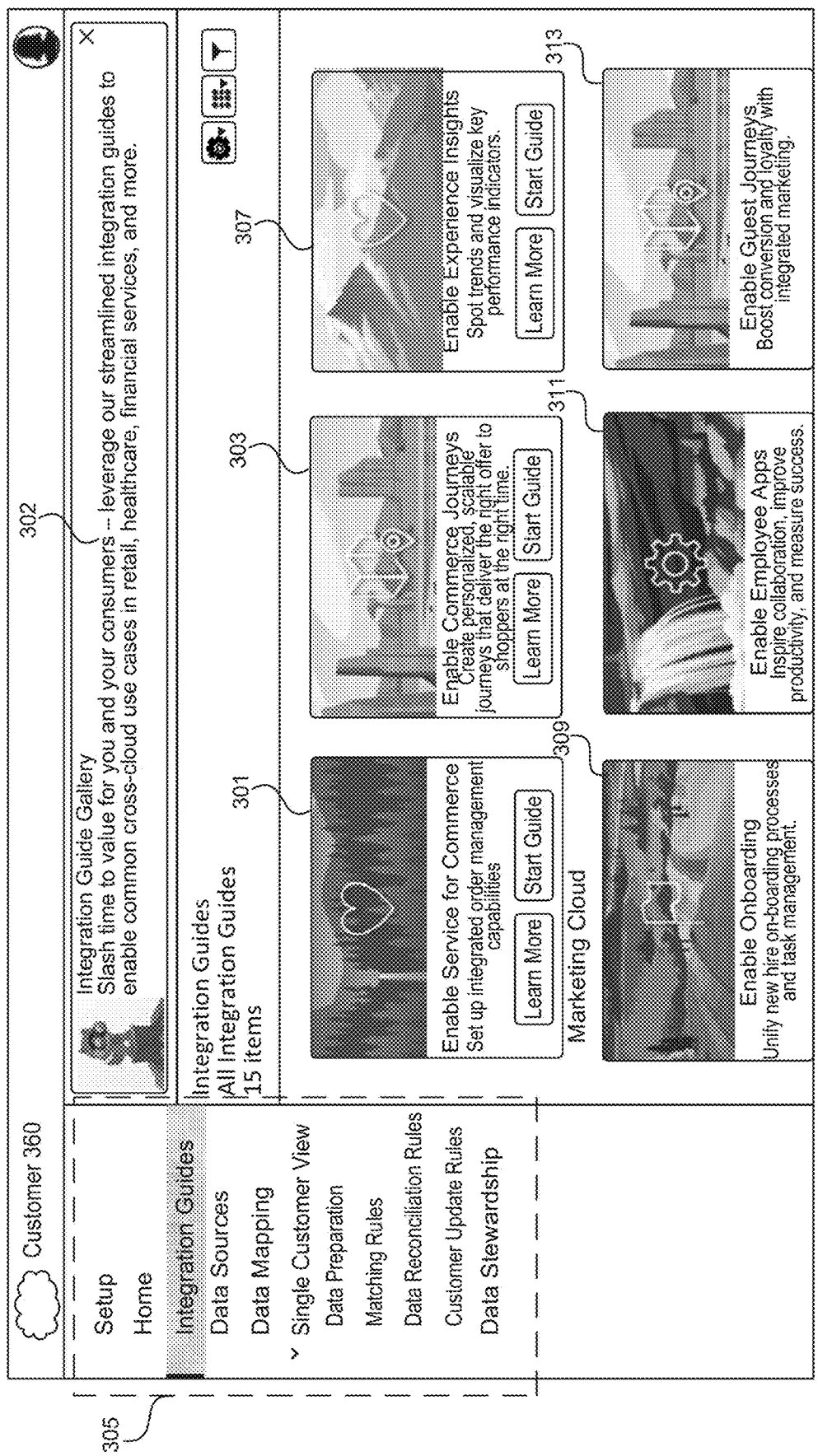
FIG. 3 illustrates a Salesforce Customer 360 GUI screenshot of setting up cross-cloud use cases using Integration Guides, according to some embodiments.

FIG. 3 illustrates a Salesforce Customer 360 GUI screenshot of setting up cross-cloud use cases using Integration Guides, according to some embodiments. The Integration Guides can include Enable Service for Commerce 301, Enable Commerce Journeys 303, Enable Experience Insights 307, Enable Onboarding 309, Enable Employee Apps 311, and Enable Guest Journeys 313, as shown in the middle of FIG. 3. The integration Guides in Setup 305 can be highlighted at this step. The Integration Guides can help the users to slash time to value for the user and user's consumers. The streamlined integration guides can enable common cross-cloud use cases in retail, healthcare, financial services, and more. And the information header 302 can update the message for Integrated Guides. After clicking on Start Guide of Enable Service for Commerce 301. The GUI can start the setup of Commerce Architecture.

Figure 4:
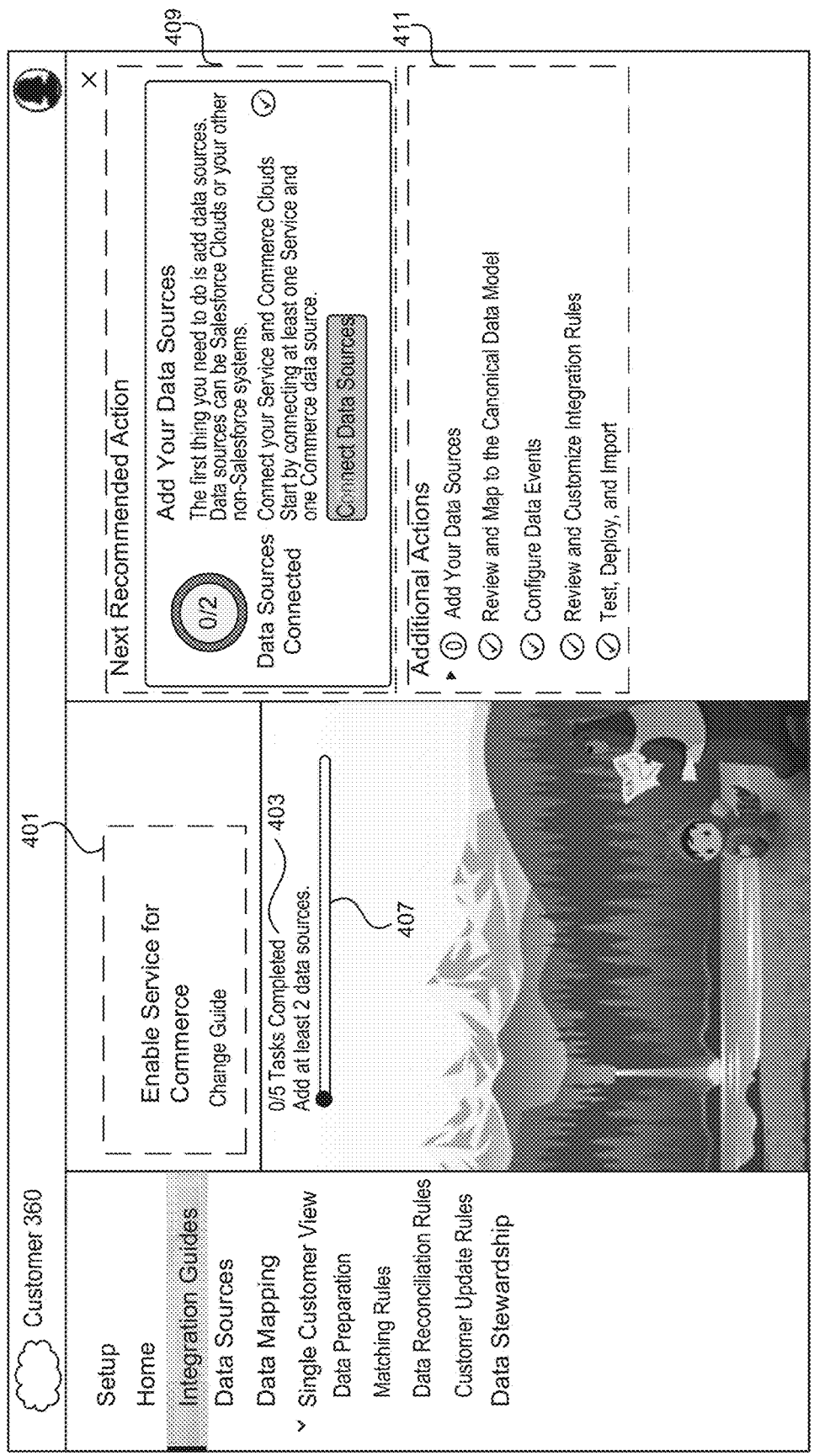
FIG. 4 illustrates a Commerce Architecture GUI screenshot of setting up Enable Service for Commerce using Integration Guides, according to some embodiments.

FIG. 4 illustrates a Commerce Architecture GUI screenshot of setting up Enable Service for Commerce using Integration Guides, according to some embodiments. The current step of Enable Service for Commerce can be indicated in 401, and the user can change to other integration guide if clicking on Change Guide under Enable Service for Commerce 401. The tasks completed and totally needed can be displayed in 403, with bar 407 indicating the progress. Next Recommended Action 409 can provide the next action for setting up the service, for example, "Connect Data Sources" in the example of FIG. 4. Additional Actions 411 can list the actions needed for setting up the service and highlight the next action, such as highlighted "Add your data sources", "Review and map to the canonical data model", "Configure Data Events", "Review and Customize Integration Rules", as well as "Test, Deploy, and Import".

Adding Data Sources

Figure 5:
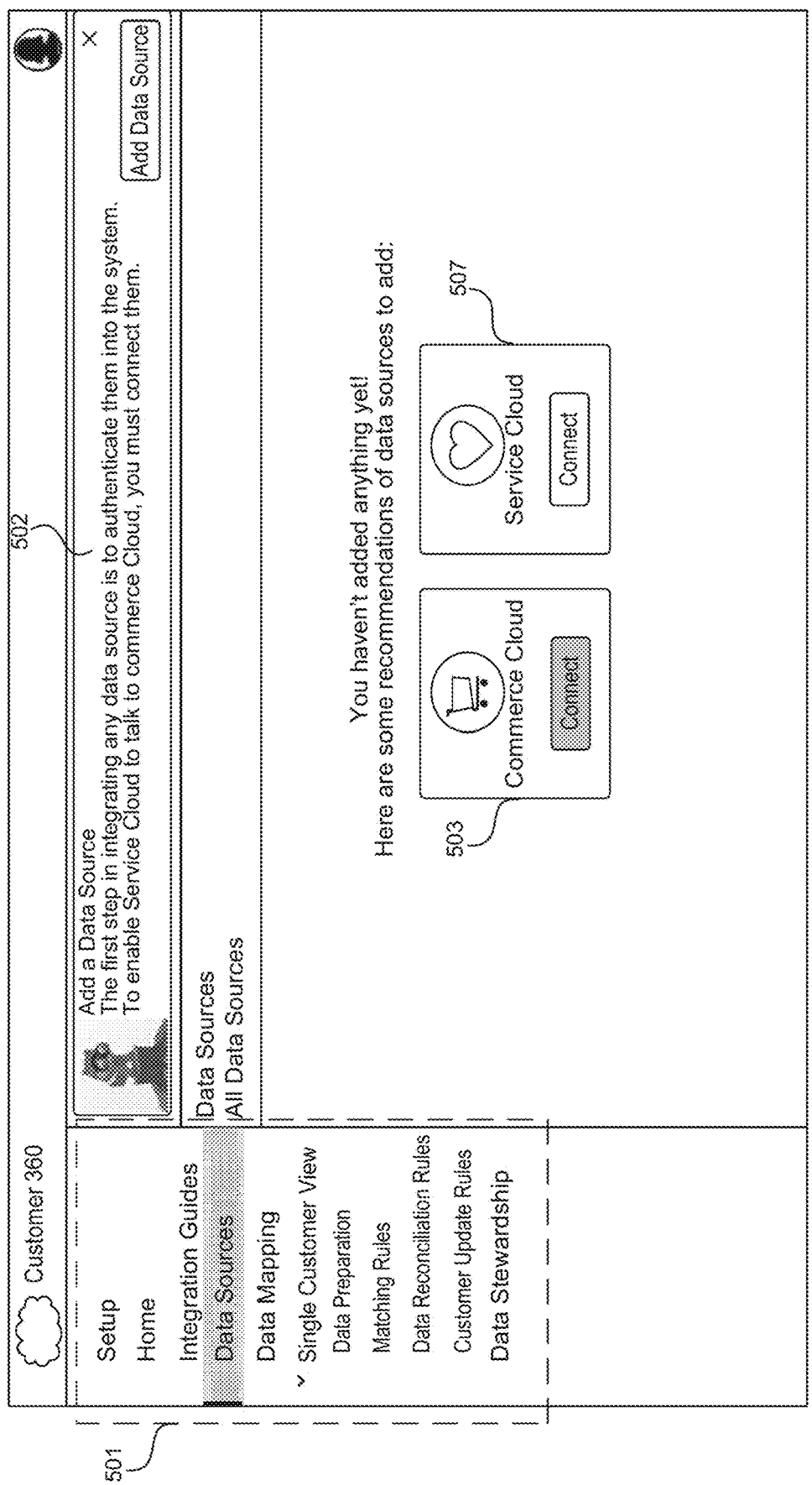
FIG. 5 illustrates a Commerce Architecture GUI screenshot of connecting data sources to set up Enable Service for Commerce, according to some embodiments.
Figure 6:
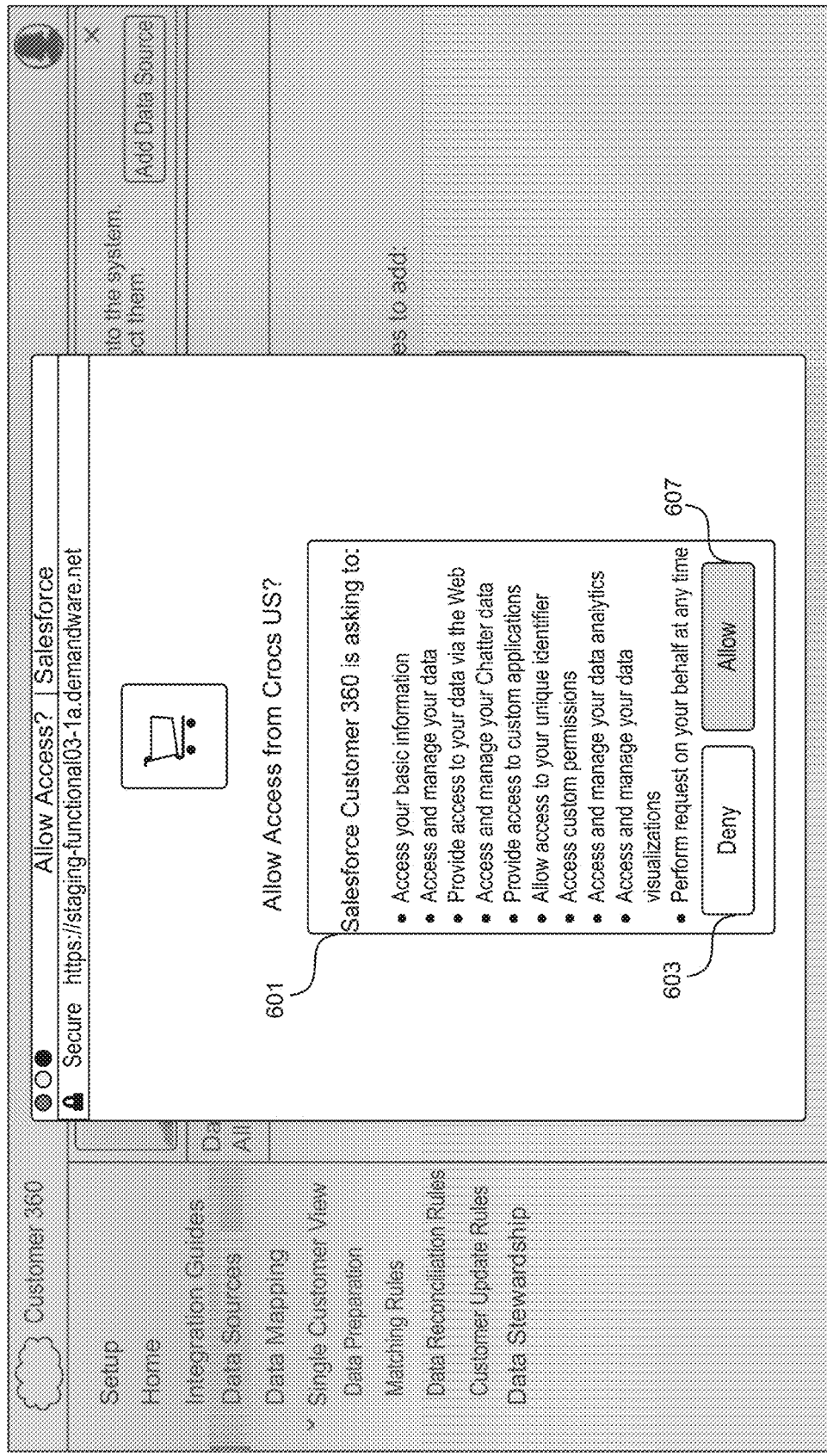
FIG. 6 illustrates a Commerce Architecture GUI screenshot of authenticating access to connect data sources for an exemplary customer, according to some embodiments.

FIG. 5-FIG. 7 illustrate Commerce Architecture GUI screenshots of connecting data sources, according to some embodiments. FIG. 5 illustrates a Commerce Architecture GUI screenshot of connecting data sources to set up Enable Service for Commerce, according to some embodiments. Data Sources tab of Setup 505 is highlighted and information header 502 is also updated for Add a Data Source. In the example of setting up Enable Service Commerce, at least 2 data sources, Commerce Cloud 503 and Service Cloud 507 need to be connected. After clicking on Connect of Commerce Cloud 503, the process of adding Commerce Cloud data will start.

FIG. 6 illustrates a Commerce Architecture GUI screenshot of authenticating access to connect data sources for an exemplary customer, according to some embodiments. Connecting to data sources needs authentication from the user. In the example of FIG. 6, connecting to Crocs US Commerce Cloud needs the user's permission to accesses authentication data 601, such as access to the user's basic information, access and manage the user's data. Clicking on Deny 603 will not allow the accesses and end the integration process. And clicking on Allow 607 will allow the access from Crocs US Commerce Cloud and integrate the data to the system.

FIG. 7 illustrates a Commerce Architecture GUI screenshot of connected data sources for an exemplary customer, according to some embodiments. In the example of FIG. 7, the connected data sources are listed in Data Sources 703. The total number of data sources and sorting of the data sources are displayed under All Data Sources 707. Each data source 709 can include Name, Type, Domain, and Production of the data source. And each data source 709 can have an associated icon in the Name field indicating the type of the data source, for example a shopping cart for Commerce Cloud and a heart for Service cloud. The iconography may be more extensive and can be based on a multitude of data sources available for selection within the GUI. The data source may be based on various applications of the CRM system, where each application, and each data source, may have a different and/or unique purpose. By clicking on Add Data Source 711, more data sources can be added to the system. According to some embodiments, at least one Commerce Cloud and one Service Cloud needs to be connected to the system to set up Commerce Architecture. After adding at least one Commerce Cloud and one Service Cloud, the next step is to map data by clicking on Map Data 713, as indicated in information header 702.

Data Mapping

FIG. 8-FIG. 15 illustrates Commerce Architecture GUI screenshots of setting up Data Mapping, according to some embodiments. An example of data mapping and transformation can be found in U.S. patent application Ser. No. 16/037,435, filed Jul. 17, 2018, which is incorporated by reference herein in its entirety.

Figure 8:
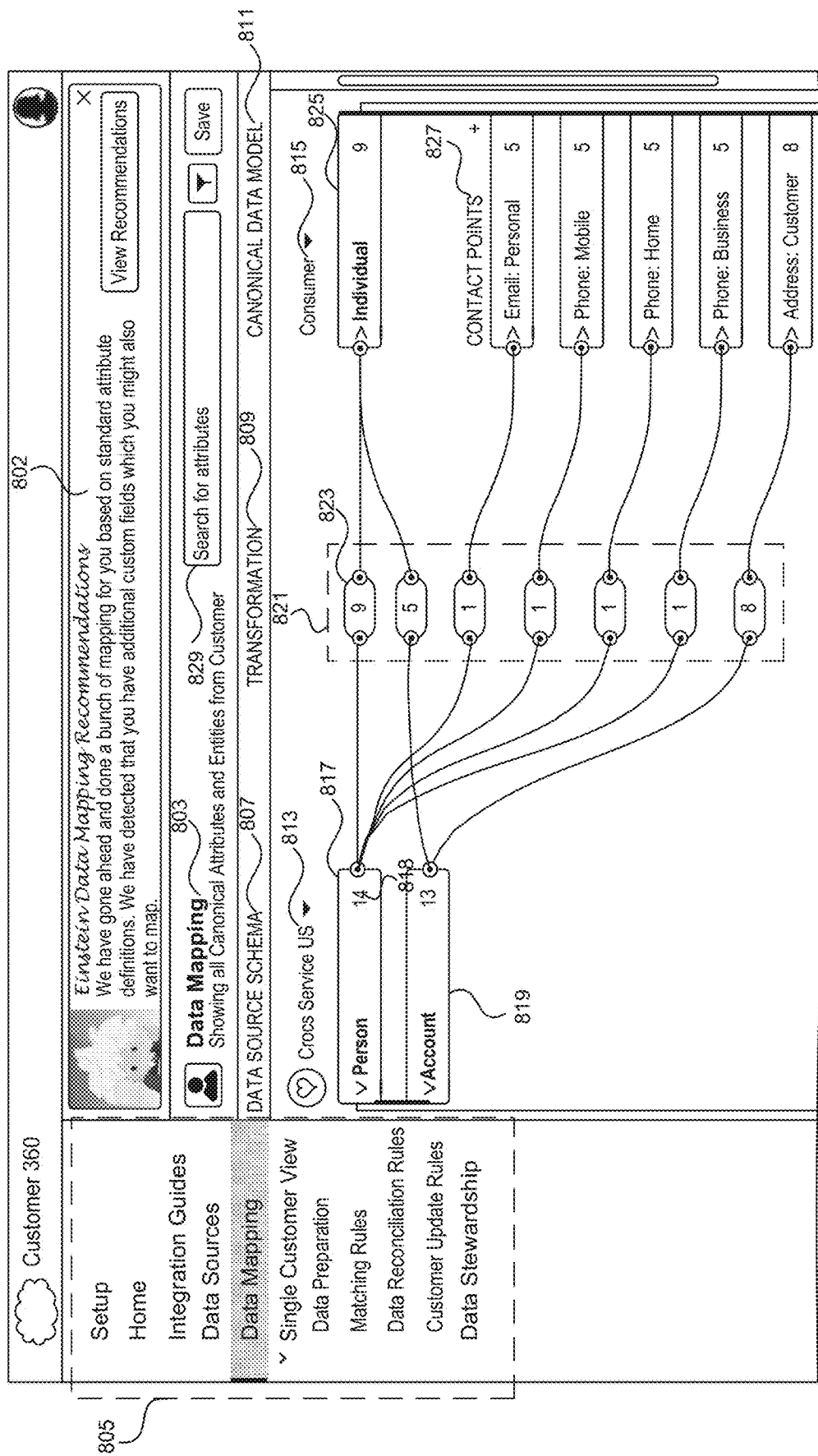
FIG. 8 illustrates a Commerce Architecture GUI screenshot of data mapping between data source schema and canonical data model, according to some embodiments.

FIG. 8 illustrates a Commerce Architecture GUI screenshot of data mapping between data source schema and canonical data model, according to some embodiments. The Data Mapping tab under Setup 805 at the left side of the GUI can be highlighted for this step. And the information header 802 at the top of the GUI can provide guidance to the user about mapping recommendation. In the example of FIG. 8, the user is informed that a bunch of default mappings based on standard attribute definitions have been done and additional custom fields need the user to map. In Data Mapping 803 of FIG. 8, several default mappings are shown. A plurality of pills 821 in the middle column Transformation 809 of the GUI shows the number of existing data mappings from one or more objects of the Data Source Schema 807 to one or more entities, or a group of a plurality of entities, and their attributes of the Canonical Data Model 811. For example, an object Person 817 of data source Crocs Service US 813 of the Data Source Schema 807 is mapped to an entity individual 825 of an entity group Consumer 815 of the Canonical Data Model 811. The object Person 817 of the Data Source Schema 807 is also mapped to an entity CONTACT POINTS 827 with a plurality of attributes, including "Email: Personal" and "Phone: Mobile", for example. The Commerce Architecture GUI also has a search box 829, allowing a user to search for an attribute as discussed.

The Data Mapping 803 of the GUI can provide useful information to the user regarding the number of data mappings made between the Data Source Schema 807 and the Canonical Data Model 811. For example, data mapping information can be provided inside the plurality of pills 821 and the object and entity representations, as well as between the object, pill, entity representations in the forms of lines connecting these representations. For example, the representation of the object Person 817 of the Data Source Schema 807 indicates that 14 fields 818 of object Person 817 need to be connected to the Canonical Data Model 811, and the object Account 819 of the Data Source Schema 807 indicates that 13 fields of object Account 819 need to be connected to the Canonical Data Model 811. By following the lines from the object Person 817, the user can see relationship connectors between this object on the left side of the GUI and the entities of the right side of the GUI.

These relationship connectors, also called "visual logic connectors", can summarize the number, or quantity of mappings from that object for the user. For example, the 14 fields 818 of object Person 817, would indicate of 14 connections out of the object Person 817 of the Data Source Schema 807, and to 14 pills of the plurality of pills 821. Each of the plurality of pills 821 lists the number of the data mappings made to entities in the Canonical Data Model 811. For example, the top pill 823 indicates 9 connections or mappings to the entity Individual 825. These 9 connections represent the number, or quantity of attributes within the entity Individual 825 that are mapped. The entity Individual 825 also displays the number 9 to indicate that here are 9 mapped attributes that can be seen under the entity Individual 825 if the entity were expanded. In total, there are 9+1+1+1+1 (=13) connections (reading down from the top pill 823). There is one connection difference for object Person 817 between 14 fields of record Person 817 and 13 connection pills connected to object Person, which is an indication of one additional custom field to map.

Because there can be a large number of mappings, the user can expand each object or entity, which allows the user to see the mappings under the respective object or entity at the field level.

Figure 9:
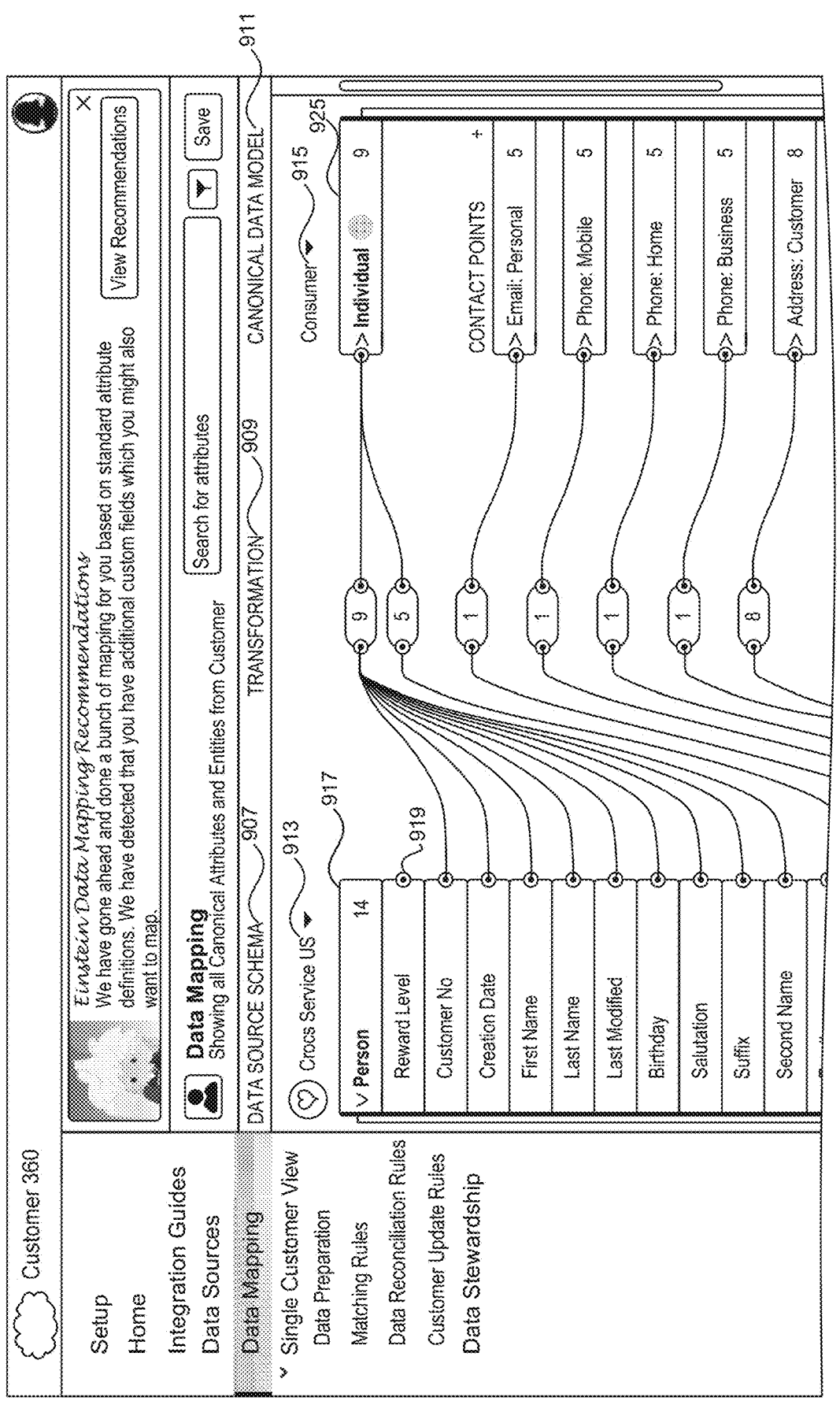
FIG. 9 illustrates a Commerce Architecture GUI screenshot of exemplary fields under one expanded object of data source schema, according to some embodiments.

FIG. 9 illustrates a Commerce Architecture GUI screenshot of exemplary fields under one expanded object of data source schema, according to some embodiments. As shown in FIG. 9, object Person 917 of Data Source Crocs Service US 913 of the Data Source Schema 907 can be expanded to reveal more details about the objects within the schema, for example Reward Level 919, Customer No, Creation Date, First Name and Last Name of the object 917. It can be seen that Reward Level 919 of object Person 917 from data source Crocs Service US 913 of Data Source Schema 907 is not mapped to any attributes of Canonical Data Model 911.

Figure 10:
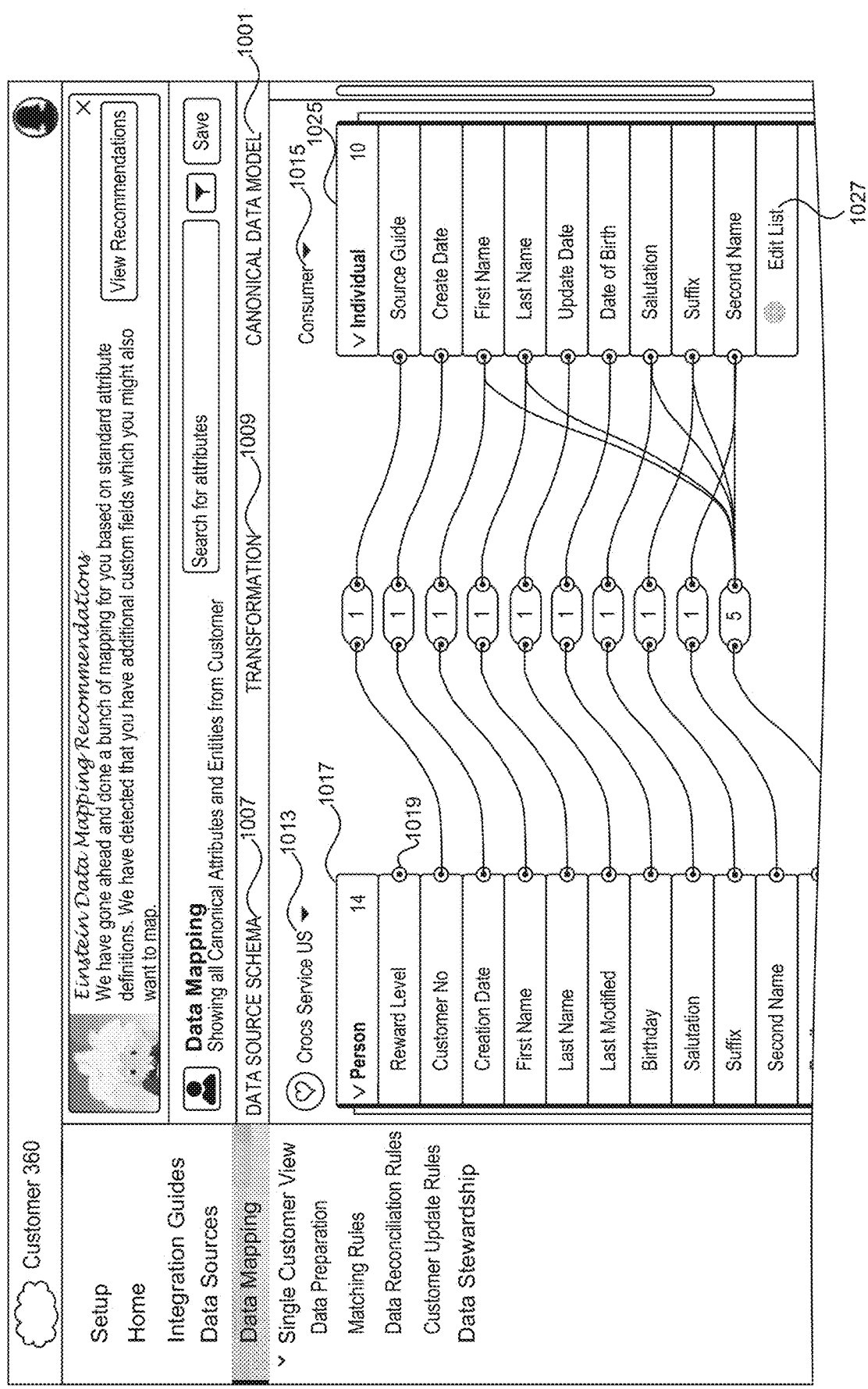
FIG. 10 illustrates a Commerce Architecture GUI screenshot of exemplary attributes under one expanded entity of canonical data model, according to some embodiments.

FIG. 10 illustrates a Commerce Architecture GUI screenshot of exemplary attributes under one expanded entity of canonical data model, according to some embodiments. In the example of FIG. 10, entity Individual 1025 of entity group Consumer 1015 of the Canonical Data Model 1011 can be expanded to reveal more details about the entity, for example, Source Guide, Create Date, First Name, Last Name and Edit List 1027 at the bottom of the expanded attributes. By clicking on Edit List 1027, new attribute can be added to the attribute list and connected to the unmapped field of Data Source Schema 1007.

FIG. 11 illustrates a Commerce Architecture GUI screenshot of the addition of one attribute to the expanded entity of canonical data model, according to some embodiments. After clicking on Edit List of an entity of the canonical data model, Canonical Details 1127 can be shown at the right side of Canonical Data Model 1111 in the GUI. In the example shown in FIG. 11, Canonical Details 1127 of entity Consumer 1115 includes more attributes, such as Reward Score 1131, Block Geolocation Tracking, Create Date, Date of Birth and Do Not Market Update Date. Each attribute could include Visibility, Attribute Label, Data type, and Description columns, in the Visibility column, a greyed check mark in the box could indicate included in the entity of the canonical data model and mapped to a field of data source schema. And a new attribute could be added by checking the Visibility box. For example, Visibility box 1129 is checked for Reward Score 1131 to be included in entity Individual 1125. The Data Type of attribute Reward Score 1131 is Integer (5) of 5 digits. After finishing editing the attribute list, the user can click on exit 1135 to return to data mapping.

Figure 12:
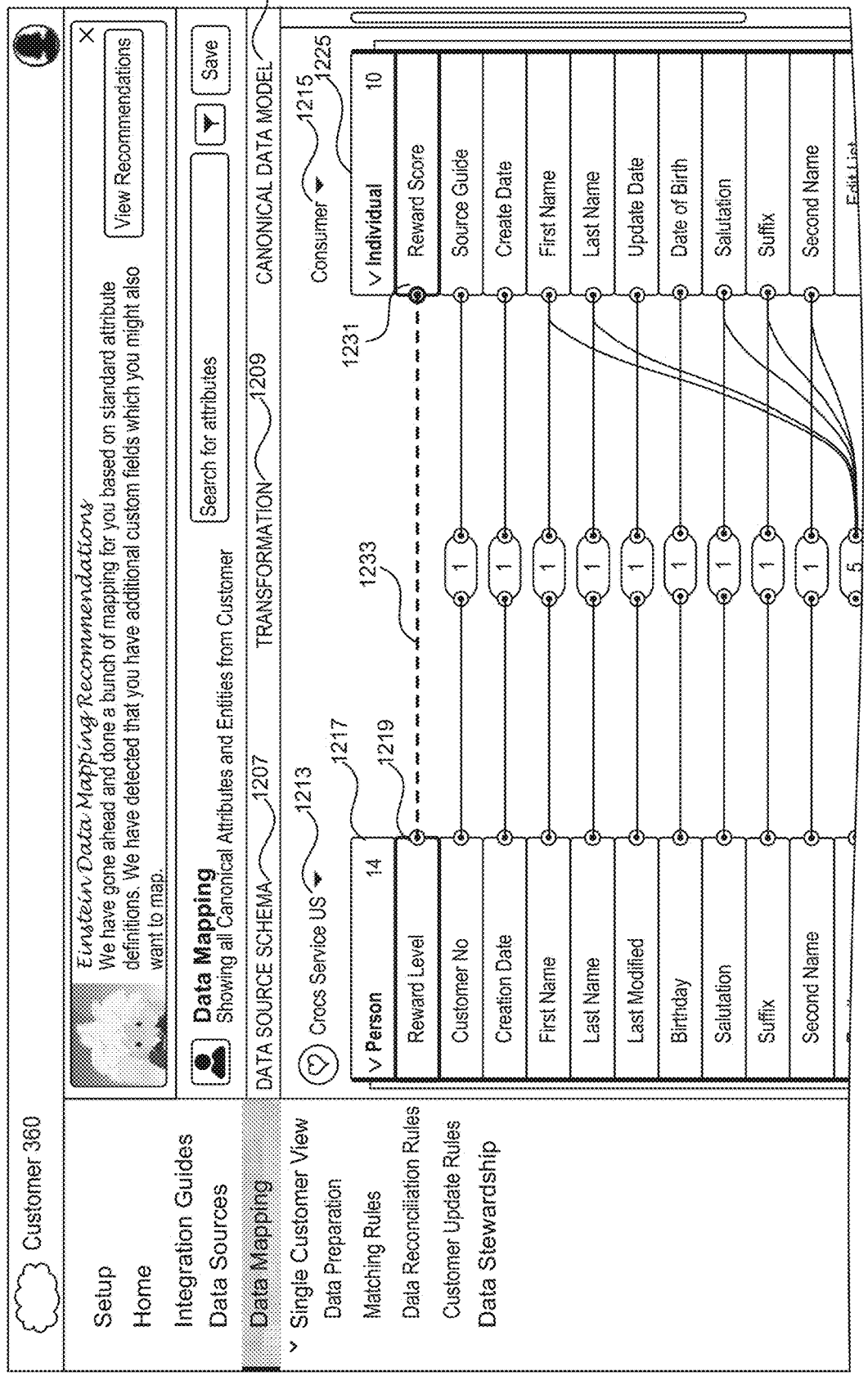
FIG. 12 illustrates a Commerce Architecture GUI screenshot of the mapping of one field under one expanded object of data source schema to the added corresponding attribute under mapped object of canonical data model, according to some embodiments.

FIG. 12 illustrates a Commerce Architecture GUI screenshot of the mapping of one field under one expanded object of data source schema to the added corresponding attribute under mapped object of canonical data model, according to some embodiments. After the addition of new attribute to Canonical Data Model 1211, the unmapped field in Data Source Schema 1207 could be connected to the new attribute by simply clicking on the unmapped field and corresponding new attribute. For example, in FIG. 12, entity Individual 1225 updates the number 9 to number 10 to indicate the updated number of attributes with the addition of Reward Score 1231. And after clicking on Reward Level 1219 of object Person 1217 and Reward Score 1231 of entity individual 1225, a dotted line 1233 would connect them and indicate the mapping of Reward Level 1219 to Reward. Score 1231.

Figure 13:
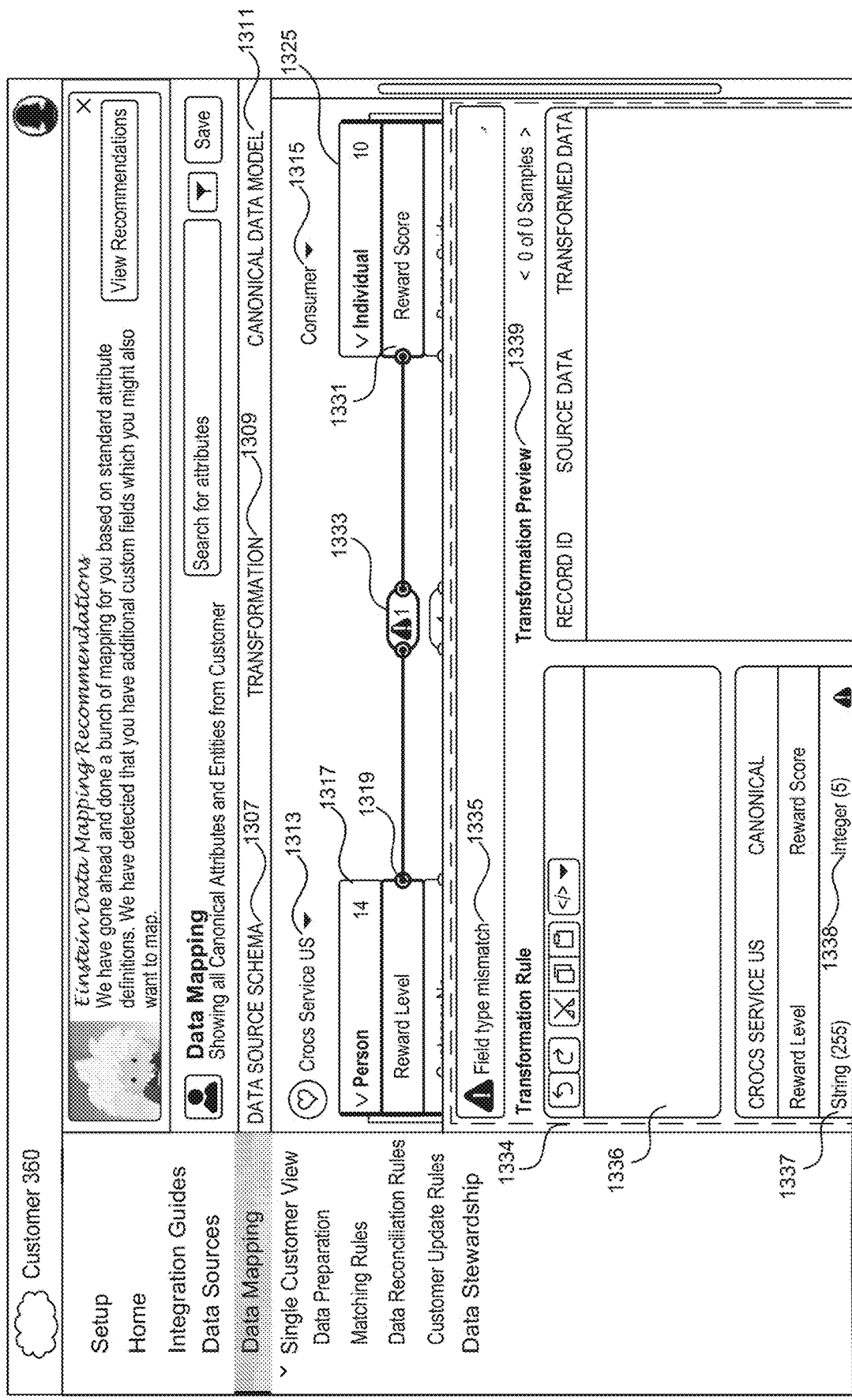
FIG. 13 illustrates a Commerce Architecture GUI screenshot of type mismatch between the field under one expanded object of data source schema to the added corresponding attribute under mapped object of canonical data model, according to some embodiments.

FIG. 13 illustrates a Commerce Architecture GUI screenshot of type mismatch between the field under one expanded object of data source schema to the added corresponding attribute under mapped object of canonical data model, according to some embodiments. In the example of FIG. 13, a new pill 1313 is added with the mapping of Reward Level 1319 of object Person 1317 and Reward Score 1331 of entity Individual 1325. And number 1 in pill 1313 indicates one connection or mapping to the attribute Reward Score 1331 of entity 1315, while the exclamation mark in pill 1313 indicates error of the connection.

When a user clicks on a pill, for example pill 1333, the GUI can open the transformation editor 1334. The transformation editor 1334 has one error message 1335, transformation rule editor box 1336, a display of current data transformations between a field of the Data Source Schema 1307 and the mapped attribute of the Canonical Data Model 1311, and a transformation preview window 1339 with a sample of the data transformed. For example, for pill 1333, error message 1335 indicates Field type mismatch. And the field type of Reward Level of Data Source Schema is String (255) 1337, while the field type of Reward Score of Canonical Data Model is Integer (5) 1338.

FIG. 14 illustrates a Commerce Architecture GUI screenshot of transformation rule setup to solve type mismatch between the field under data source schema to the corresponding attribute under canonical data model, according to some embodiments. Transformation rule editor 1436 can be edited to solve the mismatch between one field of Data Source Schema and corresponding attribute of Canonical Data Model. As shown in FIG. 14, simple code is used in transformation rule editor 1436 to solve the field type mismatch. In some embodiments, basic mismatch solving functions can be provided instead of writing code. Transformation Preview window 1439 displays a list of transformed data, with specific columns of Record ID, Source Data showing the name of each record ID, and Transformed Data showing the Reward Score of each record ID as appearing in the Canonical Data Model 1411. For example, record 89207, containing Silver as the field type of Reward Level in Source Data column, maps to 25 of Reward Score of the Canonical Data Model 1411 in Transformed Data column.

Figure 15:
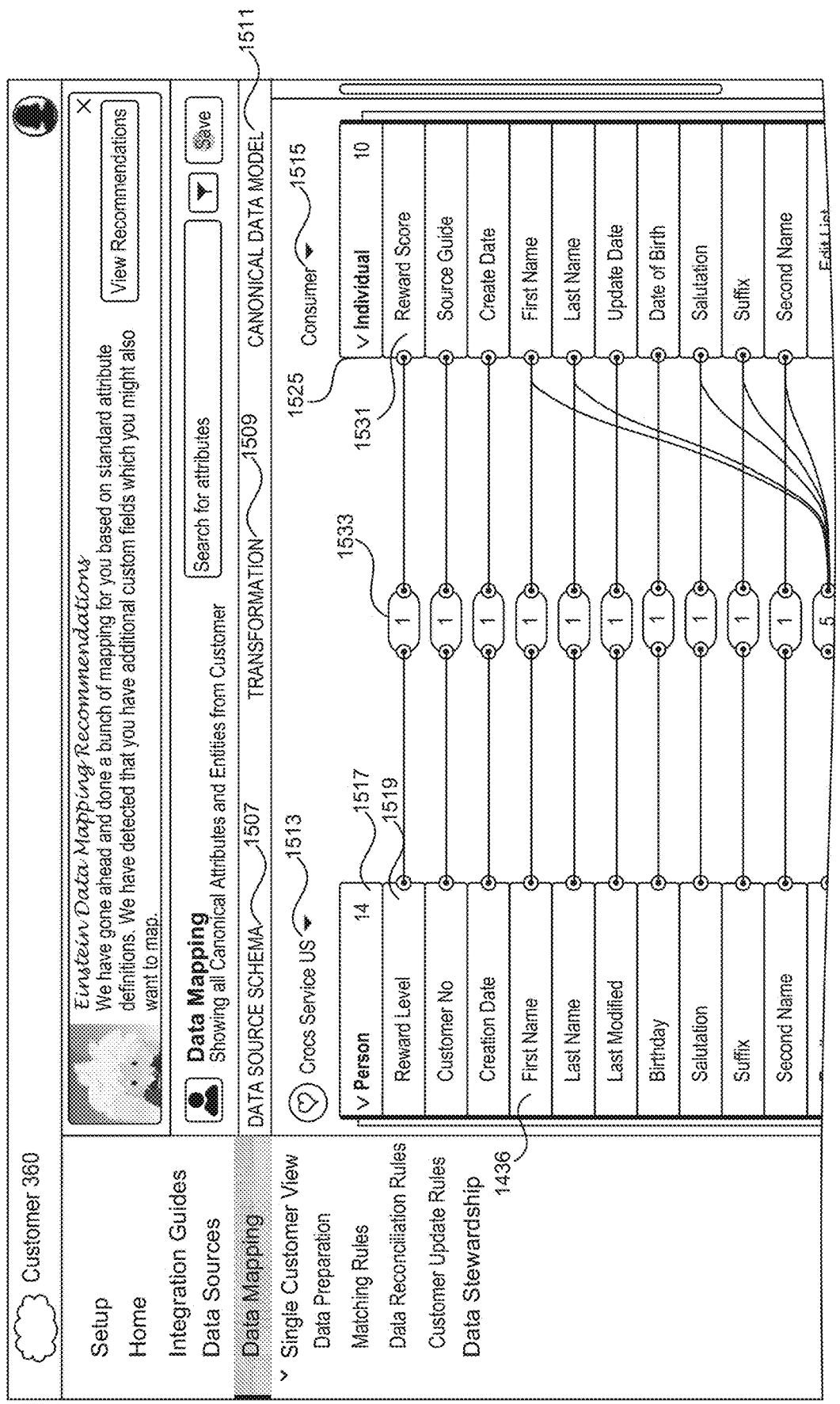
FIG. 15 illustrates a Commerce Architecture screenshot of data mapping between data source schema and canonical data model after solving data mismatch, according to some embodiments.

FIG. 15 illustrates a Commerce Architecture GUI screenshot of data mapping between data source schema and canonical data model after solving data mismatch, according to some embodiments. After filed type mismatch resolved, as shown in FIG. 15, Reward Level 1519 of entity Person 1517 in data source Crocs Service US 1513 under Data Source Schema 1507 is mapped to Reward Score 1531 of entity Individual 1525 in entity group Consumer 1515 under Canonical Data Model 1511. Pill 1533 shows 1 connection or mapping between Reward Level 1519 and Reward Score 1531 without any exclamation mark.

Single Entity View

FIG. 16-FIG. 26 illustrate Data Preparation, Matching Rules, Data Reconciliation Rules and Customer Update Rules to build single entity view, also called single customer view, according to some embodiments. FIG. 16 illustrates a Commerce Architecture GUI screenshot of data preparation for single entity view, according to some embodiments. At this step, Data Preparation tab under Setup 1605 can be highlighted and information header 1602 can be updated for Data Preparation. To build a single entity view of the Canonical Data Model, the data first needs to be prepared for customer profile consolidation. In the example of FIG. 16, Data Preparation 1603 would include Data Operations 1607, Number of Attributes 1609, Status 1611 and Last Modified 1613. For example, Address Cleansing and Normalization 1615 of Data Operation 1607 has 8 numbers of attributes 1617, and the status shows Setup Required 1619, indicating that the Address Cleansing and normalization needs setup. And Phone Cleansing and Normalization 1623 of Data Operation 1607 has 3 numbers of attributes 1625, and the status also shows Setup Required 1627.

FIG. 17 illustrates a Commerce Architecture GUI screenshot of setting up an exemplary default value for data preparation, according to some embodiments. After clicking on the Setup Required 1627 of FIG. 16, a new editor window 1703 can display the required setup. For example, in FIG. 17, Set Default County window 1703 is shown in the GUI to require setting up the default county for connected data sources. Data sources 1707 and Default Country for Address 1709 are included to set default country. For example, NTO North America 1733 needs to set up the default county, choosing from Canada, or United States of America. After setting up default country for each Data source, the user can click Save & Activate 1815 to finish setting default country for each data source.

FIG. 18 illustrates a Commerce Architecture GUI screenshot of completing required setup for data preparation, according to some embodiments. In the example shown in FIG. 18, the Status 1811 updates from Setup Required 1619 to Active 1819 after Address Cleansing and Normalization 1815 completes the required setup of default country in FIG. 17. Phone Cleansing and Normalization 1823 also finishes the required setup of default country values, as indicated in message box 1831. Status 1811 for Phone Cleansing and Normalization 1823 updates to Active 1827 as well.

Figure 19:
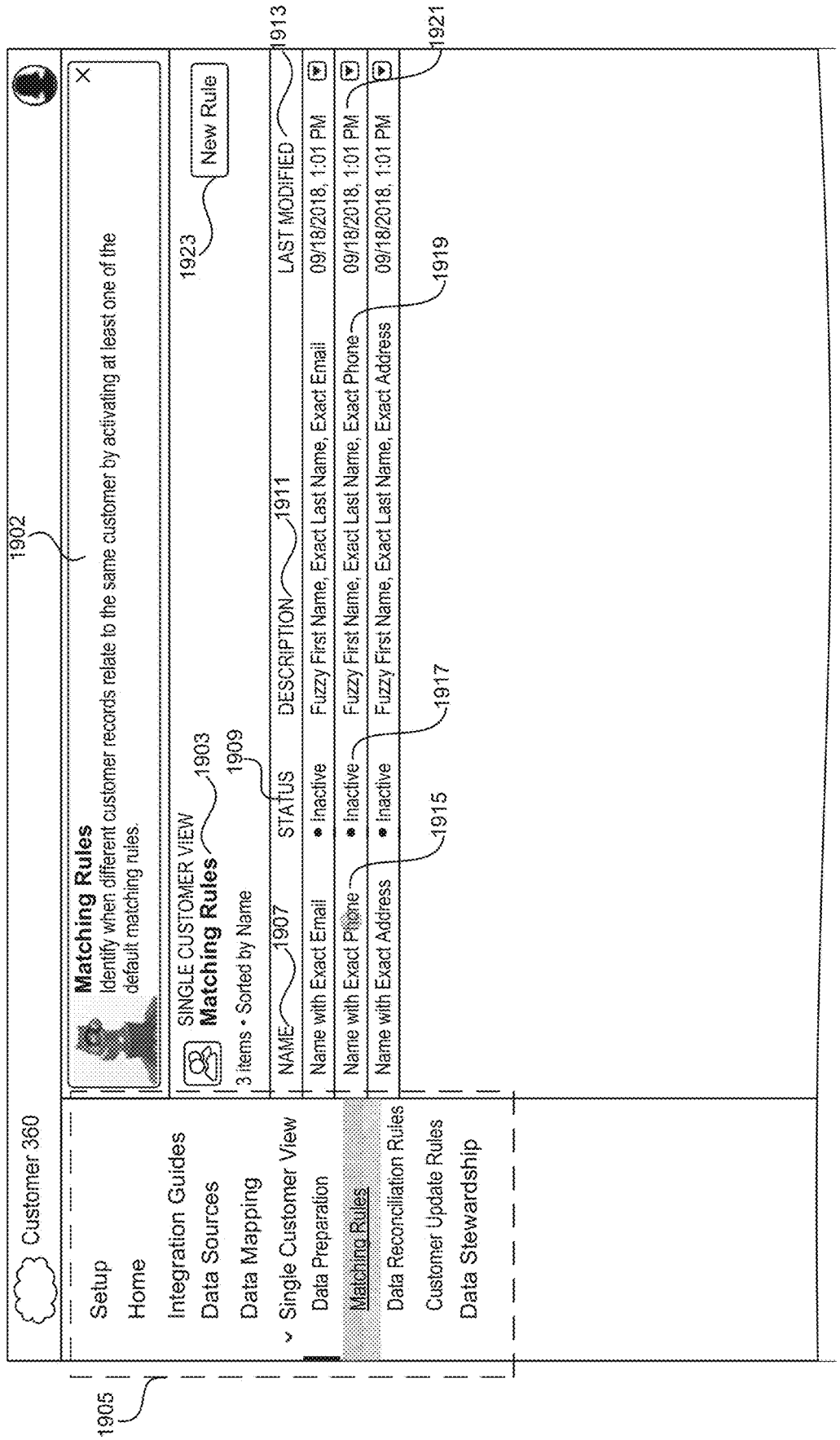
FIG. 19 illustrates a Commerce Architecture GUI screenshot of matching rules for single entity view, according to some embodiments.

After Data. Preparation is completed, matching rules can be set up to identify different customer records that relate to the same customer. At least one of the default matching rules can be activated by the system, and additional matching rules could be set up or updated by a user. FIG. 19 illustrates a Commerce Architecture GUI screenshot of matching rules for single entity view, according to some embodiments. During setup of matching rules, Matching Rules tab under Setup 1905 can be highlighted and information header 1902 can be updated for Matching Rules. In the example of FIG. 19, Matching Rules 1903 includes Name 1907, Status 1909, Description 1911, and Last Modified 1913 of the match rules. For example, matching rule Name with Exact Phone 1915 has a status of inactive 1917, a description of "Fuzzy First Name, Exact Last Name, Exact Phone" 1919, and was last modified at "Sep. 18, 2018, 1:01 PM" 1921. After clicking on one matching rule, such as Name with Exact Phone 1915, the details of the matching rule can be reviewed and edited. New matching rule can also be added by clicking on New Rule 1923.

Figure 20:
FIG. 20 illustrates a Commerce Architecture GUI screenshot of exemplary matching criteria setup for one matching rule, according to some embodiments.

FIG. 20 illustrates a Commerce Architecture GUI screenshot of exemplary matching criteria setup for one matching rule, according to some embodiments. After one matching rule is clicked and displayed in detail in the GUI, the details of Matching Criteria 2007 and Matching Logic 2027 for the matching rule can be seen. For example, in FIG. 20, matching rule Name with Exact Phone 2003 has rule information of Description, Status, and Last modified as in FIG. 19, as well as Matching Criteria 2007 and Matching Logic 2027. Matching Criteria 2007 includes Entity 2009, Attribute 2011, matching Method 2013, Fuzziness 2015, and Match Blank Fields 2017. The first matching criteria has entity Customer 2019, attribute First Name 2021, matching method Fuzzy First Name 2023, and fuzziness Similar Spelling 2025. There is no entry for match blank fields for the first matching criteria. And the Matching Logic 2027 for the Matching Criteria 2007 of matching rule Name with Exact Phone 2003 is "All of the conditions are met (AND)". The matching rule can be updated by clicking on Edit 2031, Delete 2033, Clone 2035, or Activate 2037 at the top right of the GUI. For example, after clicking on Edit 2031, matching rule Name with Exact Phone 2003 can be edited.

Figure 21:
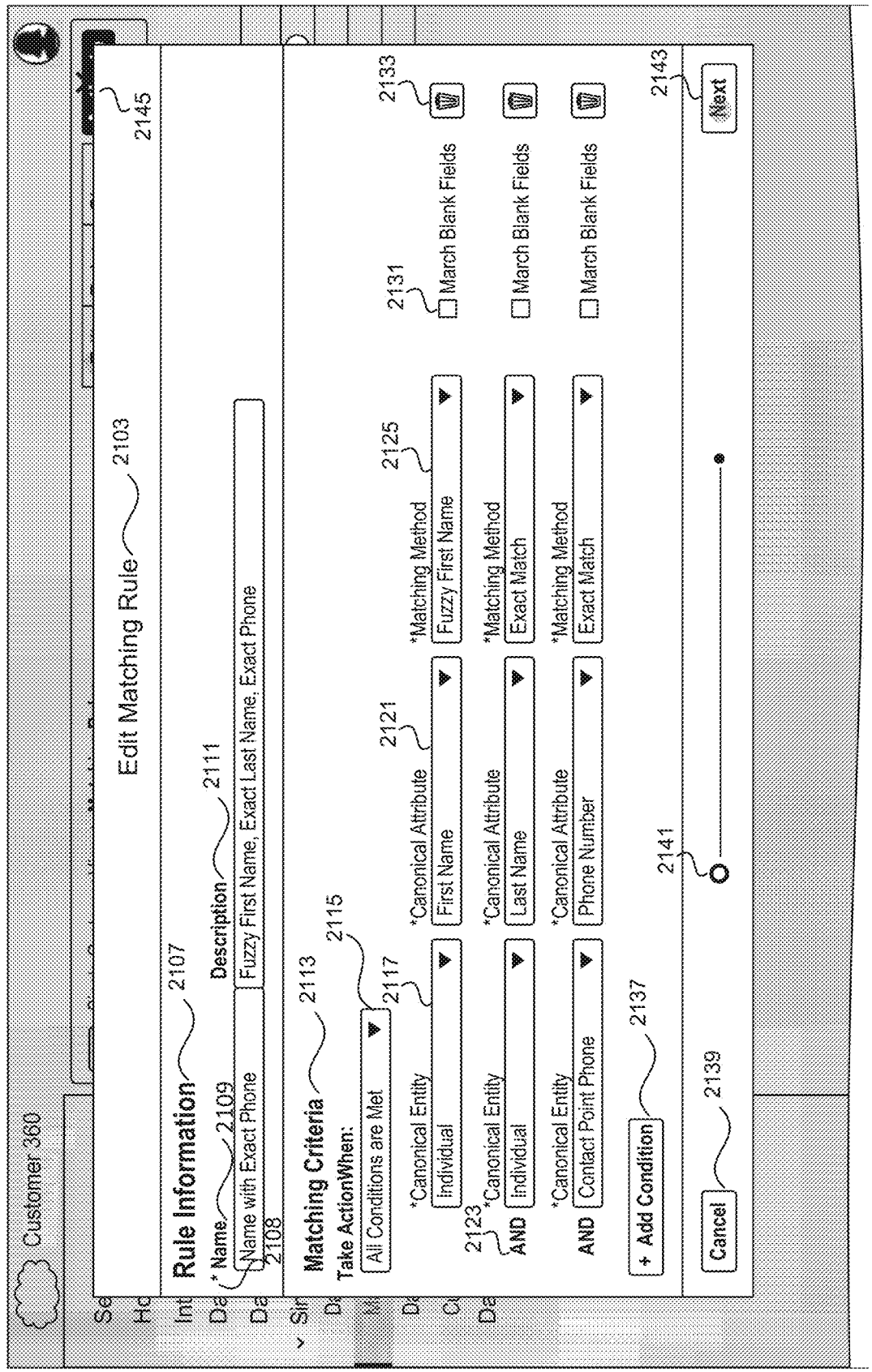
FIG. 21 illustrates a Commerce Architecture GUI screenshot of editing of one matching rule, according to some embodiments.

FIG. 21 illustrates a Commerce Architecture GUI screenshot of editing of one matching rule, according to some embodiments. In the example shown in FIG. 21, Matching Rule editor 2103 includes Rule information 2107 and Matching Criteria 2113. Rule information 2107 has Name 2109 and Description 2111, which can be edited by user's input. An asterisk 2108 in front of Name 2109 indicates that this information is required. Matching Criteria 2113 can set up when to take action, such as dropdown menu "All Conditions are Met" 2115. Other conditions could also be selected from dropdown menu 2115, according to some embodiments. Each matching condition can include Canonical Entity dropdown menu 2117, Canonical Attribute dropdown menu 2121, Matching Method dropdown menu 2125, and Match Blank Fields checkbox 2131. And one matching condition can be deleted by clicking on the garbage bin icon 2133, or new matching condition can be added by clicking on Add Condition 2137. Matching logic between each condition is shown at the front of each row of condition starting from the $2^{nd}$ row, such as AND 2135. Once the parameters are entered, the user can click Next 2143 to continue the editing. The indicator bar 2141 can indicate the process step of editing matching rule through moving the circle along the line. The user can also click Cancel 2139 or "X" 2145 to close Edit Matching Rule 2103 without saving the edited matching rule.

FIG. 22 illustrates a Commerce Architecture GUI screenshot of match preview after editing of the matching rule, according to some embodiments. After editing the matching rule, Match Preview 2209 will list samples of matching result, as shown in FIG. 22. Match Preview 2209 can include Sample Record 2215, Potential Match Record 2217, Field Match 2219 and Match Results 2221. Sample information bar 2223 can indicate the samples shown in the GUI and the total number of samples. The use can also click on the left and right arrow of sample information bar 2223 to review different samples. Rule Information 2207 and matching Criteria 2213 are also displayed at the right side of the GUI. In the example of FIG. 22, the first sample record with "First name: Joe, Last Name: Smith, Phone: (303)603-4211" is matched with potential match record "First Name: Joseph, Last name: Smith, Phone: (303)603-4211" under Matching Criteria 2213. After the user has reviewed the samples and confirmed the matching rule, the user can click Save & Activate 2225 to save and activate the matching rule.

Figure 23:
FIG. 23 illustrates a Commerce Architecture GUI screenshot of the matching rule after editing, according to some embodiments.

FIG. 23 illustrates a Commerce Architecture GUI screenshot of the matching rule after editing, according to some embodiments. In FIG. 23, a message box 2307 indicates the matching rule has been saved and activated. And the GUI returns to the Matching Rules window 2303, similar as Matching Rules window 1903. Matching rule Name with Exact Phone 2315 has an updated status Active 2317 and updated Last modified "Sep. 19, 2018, 1:05 PM" 2321.

FIG. 24 illustrates a Commerce Architecture GUI screenshot of data reconciliation rules for single entity view, according to some embodiments. When there are multiple values available from different data sources, a reconciliation rule is needed to determine which value to use for one single master file, as any attribute can only have one value. As show in FIG. 24, Data Reconciliation Rules tab under Setup 2405 can be highlight for setting up the rules, and information header 2402 can be updated for Data Reconciliation Rules. In the middle of the GUI, Data Reconciliation Rules 2403 can include Attribute Name 2407, Entity 2409, Data Type 2411, Attribute Type 2413, Reconciliation Rule 2415 and Last Modified 2417. For example, the first data reconciliation rule has attribute name of First Name 2419, entity of individual, data type as Test, attribute type as Standard, reconciliation rule of Last Updated and last modified at "Sep. 18, 2018, 1:01 PM". After clicking on one data reconciliation rule, such as First Name 2419, the details of the data reconciliation rule can be reviewed and edited. New data reconciliation rule can also be added by clicking on New Ruleset 2423.

FIG. 25 illustrates a Commerce Architecture GUI screenshot of the data reconciliation rule for one exemplary attribute, according to some embodiments. After clicking on one reconciliation rule, the details of the rule is displayed in the GUI. In the example shown in FIG. 25, data reconciliation rule First Name 2503 has rule information of Description, Entity, Attribute Type, and Data Type as in FIG. 24, as well as Details 2507 and Source Mappings 2509. Details 2507 includes Active Rule 2511, Description 2513, Primary Tie Breaker 2515, Secondary Tie Breaker, and Last Modified. For example, Active Rule 2511 of Last updated has a Description 2513 of "The last updated value is reconciled.". The Primary Tie Breaker 2515 for Active Rule 2511 is Source Priority, the Secondary Tie Breaker 2517 is Frequency, and the rule is Last Modified at "Sep. 18, 2018, 1:01 PM". In FIG. 25. View Tie Breaker Rule 2521 includes Priority 2523, Data Source 2525, Cloud Name 2527, Source Object 2529, Primary Tie Breaker 2531, and Secondary Tie Breaker 2533. The tie breaker rule can define which rule to follow when there is a tie for current rule. For example, if the value for First Name 2503 is updated in different data sources at the same time, then there is a tie for Active Rule 2511 of Last Updated. Primary Tie Breaker 2515 of Source Priority could determine which value to use. Priority 2523 lists the priority order to follow for different data sources. In this case, the value of first name from data source Crocs Global will be used for the update. If there are two values of first name from Crocs Global updated at the same time, then Primary Tie Breaker 2531 and Secondary Tie Breaker 2533 will be considered to decide which value to use. The Active Rule 2511 can also be edited by clicking on Edit 2535.

Figure 26:
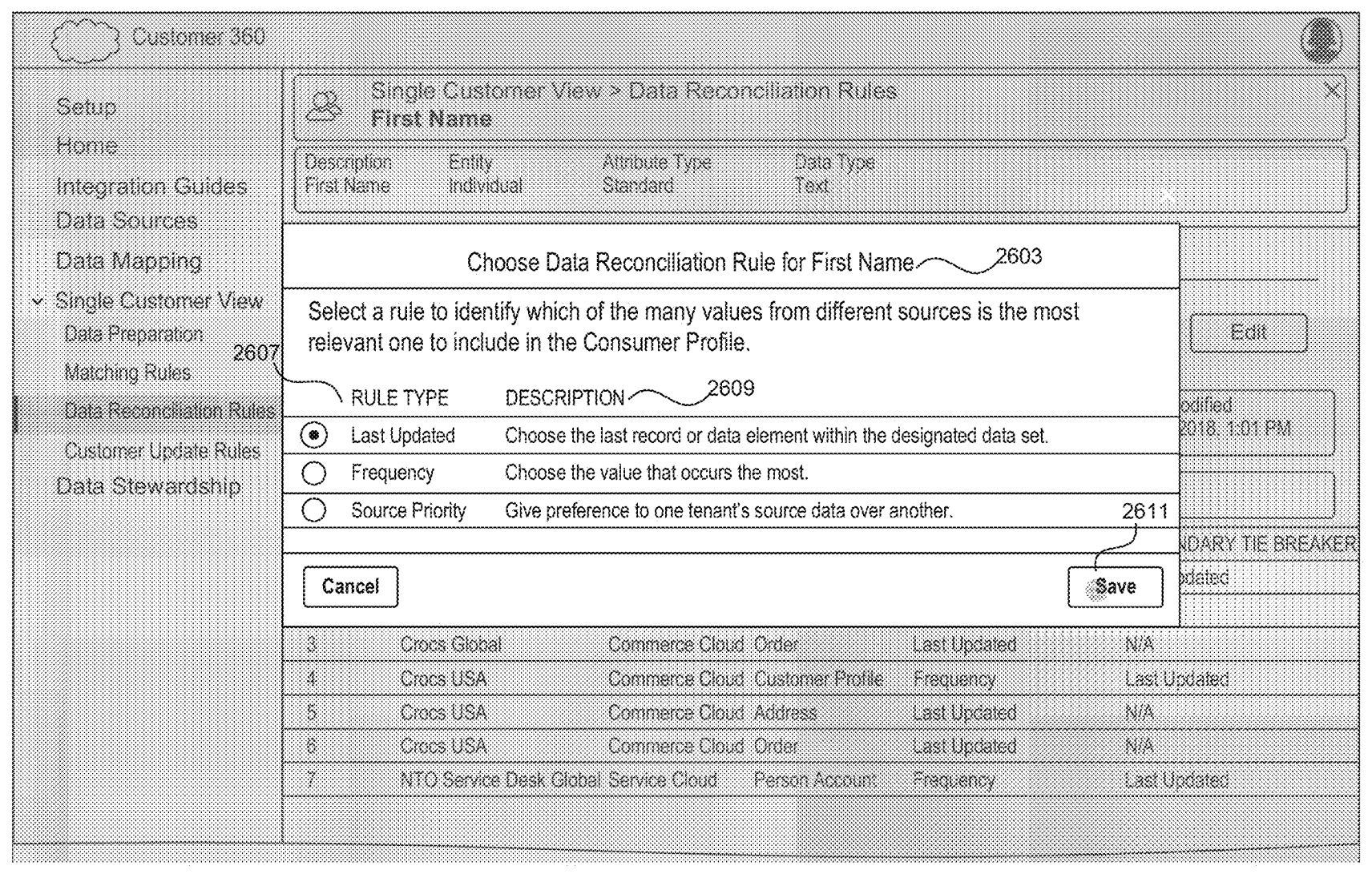

FIG. 26 illustrates a Commerce Architecture GUI screenshot of the editing of the data reconciliation rule for the exemplary attribute, according to some embodiments. As shown in FIG. 26, Reconciliation Rule editor 2603 Choose Data Reconciliation Rule for First Name is displayed in the GUI after clicking on Edit 2535 of Active Rule 2511. The reconciliation rule editor includes Rule Type 2607 and Description 2609. For example, rule type of Last Updated has a corresponding description "Choose the last record or data element within the designated data set." After the user has updated the rule in the reconciliation rule editor 2603, the user can click Save 2611 to save the reconciliation rule.

FIG. 27 illustrates a Commerce Architecture GUI screenshot after the editing of the data reconciliation rule for the exemplary attribute, according to some embodiments. After saving the edited data reconciliation rule, a message box 2704 can be displayed to indicate the setting up of new data reconciliation rule. And Last Modified 2719 of Active Rule 2711 in Details 2707 can also be updated with a new time stamp.

Data Stewardship

Data stewardship can help to improve the data quality based on customer interactions and system intelligent recommendations. Requests for data improvement can be sorted by priority. Data stewardship also allows a user or administrator to edit or delete a master record. For example, for compliance with privacy laws, like General Data Protection Regulation (GDPR), if a consumer wants their information deleted, then data stewardship module can be used to delete the consumer's record in the system. Data stewardship also allows a user to run queries against profiles and determine the source for the data in the profile.

FIG. 28 illustrates a Commerce Architecture GUI screenshot of data stewardship, according to some embodiments. In FIG. 28, after clicking on Data Stewardship tab under Setup 2805, the Data Stewardship tab is highlighted, and information header 2802 is updated for Data Stewardship. In the middle of the GUI, Data Stewardship 2803 can include Request Queue 2807 and Search 2809, wherein Request Queue 2807 displays list of request sorted by relevance. Each request can include Priority 2811, Request Type 2813, Requestor 2815, Name 2817, Status 2819, Request Date 2821, and Request ID 2823. Priority 2811 column can also include a gauge icon 2825 to indicate the priority level in addition to the text description of priority level. For example, Request ID 62428 has a high priority and request type of Privacy Delete. It's a new request from requester Andy Wilson for customer Farrah Nichols, requested on 09/1802018. Clicking on the request type, such as the Privacy Delete 2827 in the Request Queue 2807, can provide more information of the request.

Figure 29:
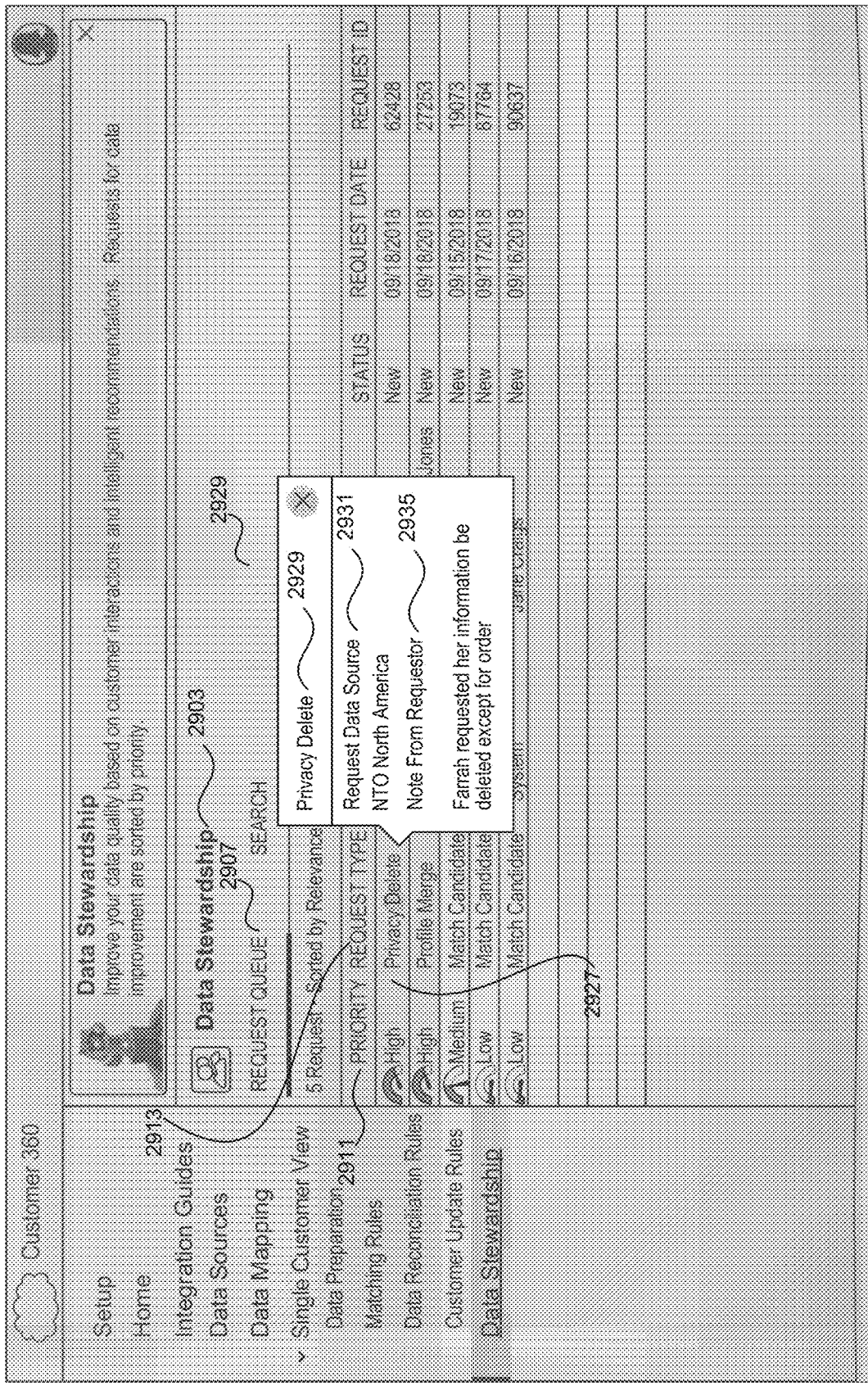
FIG. 29 illustrates a Commerce Architecture GUI screenshot of the details of an exemplary request type for data stewardship, according to some embodiments.

FIG. 29 illustrates a Commerce Architecture GUI screenshot of the details of an exemplary request type for data stewardship, according to some embodiments. As shown in FIG. 29, after clicking on the Privacy Delete 2927 request type for the first request in Request Queue 2907, a pop-up message box 2929 can provide the details of the Privacy Delete. For example, in FIG. 29, Privacy Delete 2929 message box includes Request Data. Source 2931 from INTO North America, and Note From Requestor 2935 that "Farrah request her information be deleted except for orders."

FIG. 30 illustrates a Commerce Architecture GUI screenshot of the details of the exemplary request for data stewardship, according to some embodiments. In the example of FIG. 30, Profile Merge request for Samantha Smith-Jones 3003 is opened in the GUI when the request ID 27253 is clicked for Profile Merge 2829 in FIG. 28. The detailed information for Samantha Smith-Jones 3003 are provided on Records, Request By, Requested From, Priority, Status, and Note from Requestor. For example, Samantha Smith-Jones 3003 is request by Andy Wilson to merge two records of Sam's reward level due to her two profiles in the system. Each record is displayed below the request information with ID 3009, Name 3011, Email 3013, Phone 3015, and Address 3017. The user can view the details of these two records and proceed to merge the records by clicking on Merge Records 3007.

Figure 31:
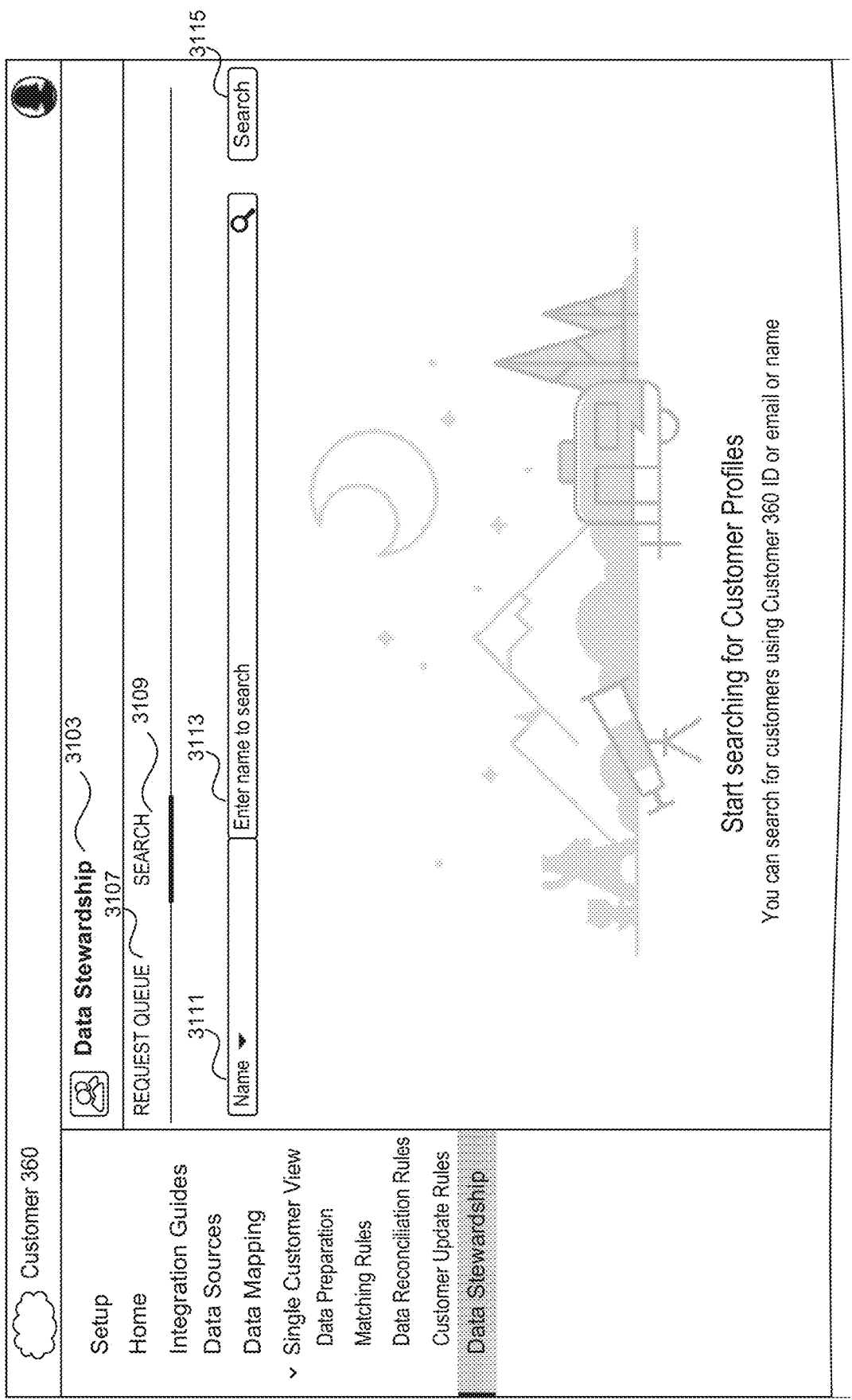
FIG. 31 illustrates a Commerce Architecture GUI screenshot of the search function of data stewardship, according to some embodiments.

FIG. 31 illustrates a Commerce Architecture GUI screenshot of the search function of data stewardship, according to some embodiments. In FIG. 31, record search function of the Data Stewardship 3103 is displayed in the GUI when clicking on Search 2809 tab of FIG. 28. The search function provides a dropdown menu 3111 to search for a record, such as Name, and a search box 3113 for text input. The user can click Search 3115 to perform the record search.

Figure 32:
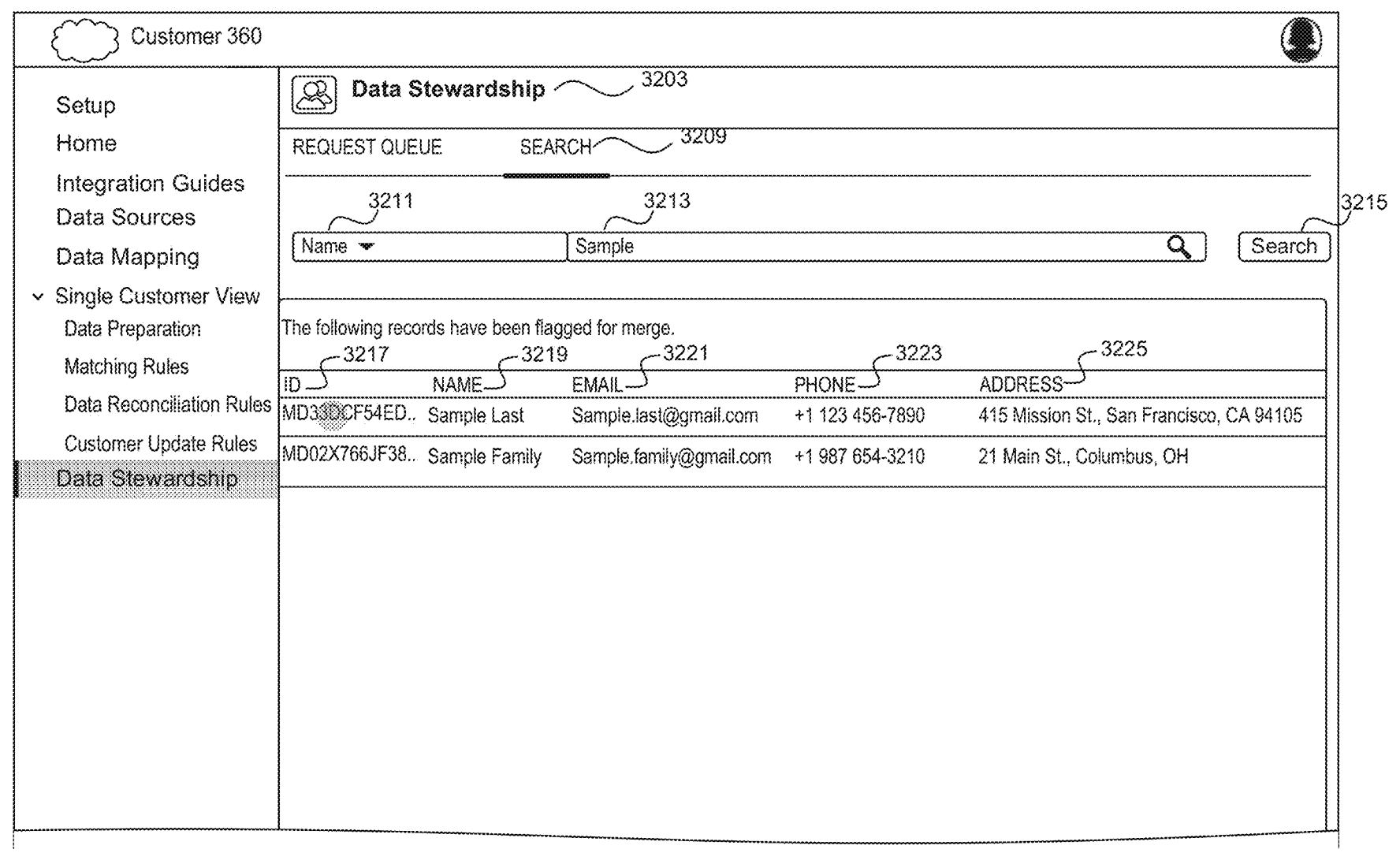

FIG. 32 illustrates a Commerce Architecture GUI screenshot of the search result of data stewardship, according to some embodiments. As shown in FIG. 32, two search results are displayed when Sample is entered in search box 3213 for a Name 3211 record search. These two records are sorted by relevance and listed below the search box in the GUI. Each record includes ID 3217, Name 3219, Email 3221, Phone 3223, and Address 3225. The user can click on the II) of the record to view more details of record.

Figure 33:
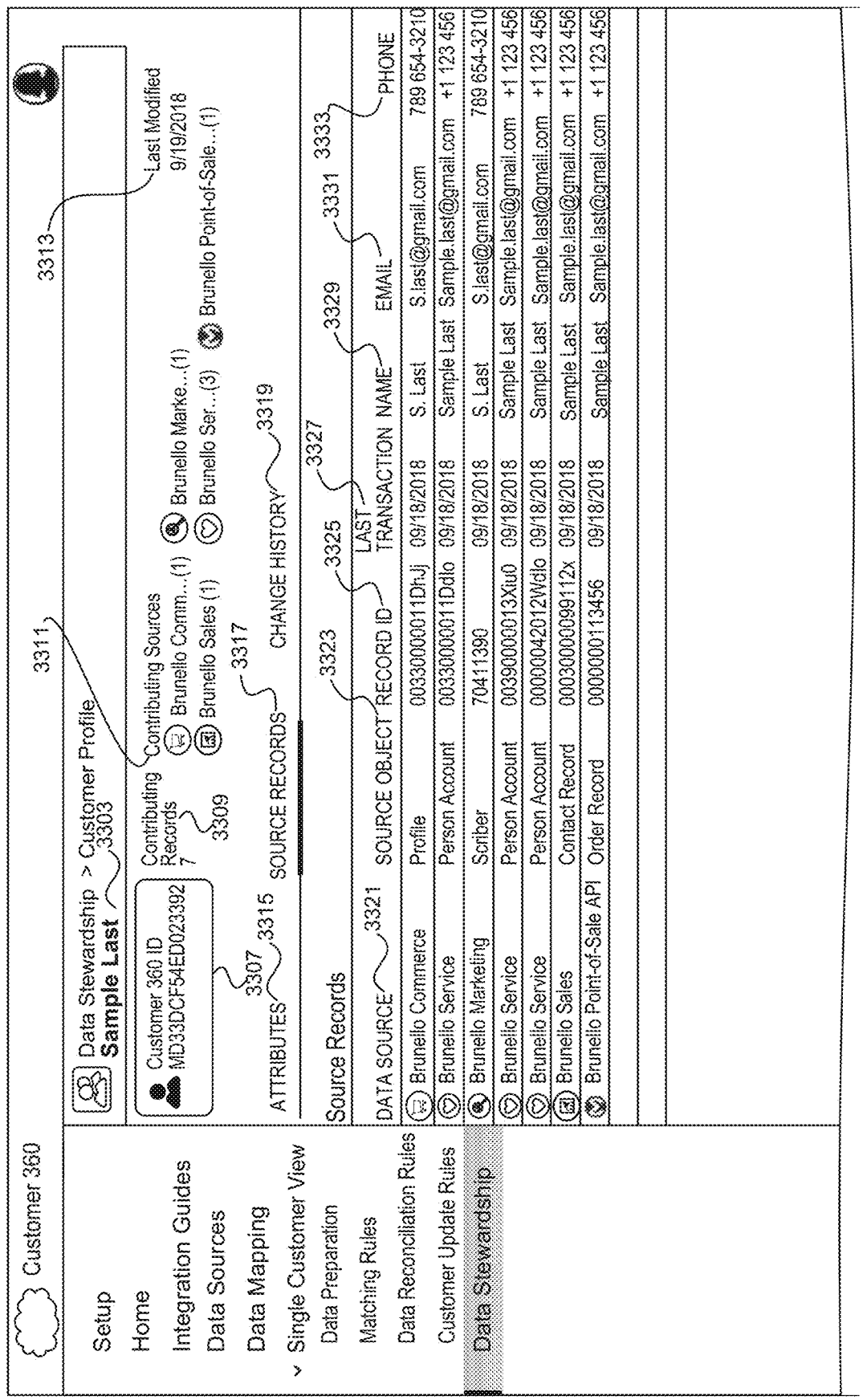
FIG. 33 illustrates a Commerce Architecture GUI screenshot of exemplary customer profile for the data stewardship.

FIG. 33 illustrates a Commerce Architecture GUI screenshot of exemplary customer profile for the data stewardship. In the example of FIG. 33, the details of customer profile for Sample Last 3303 is displayed in response to a click on the search result ID for Sample Last in FIG. 32. Customer 360 ID 3307, Contributing Records 3309, Contributing Sources 3311, and Last Modified 3313 are provided for Sample Last 3303. And below Customer Profile Sample Last 3303, Attributes 3315, Source Records 3317, Change History 3319 are also shown in the GUI. Each of the source record includes Data Source 3321, Source Object 3323, Record ID 3325, Last Transaction 3327, Name 3329, Email 3331, and Phone 3333. For example, customer profile of Sample Last is contributed from data source Brunello Commerce. The source object Profile in Brunello Commerce contribute the name S. Last, email S.last@gmail.com and phone 789 654-3210 for the customer profile of Sample Last.

Figure 34:
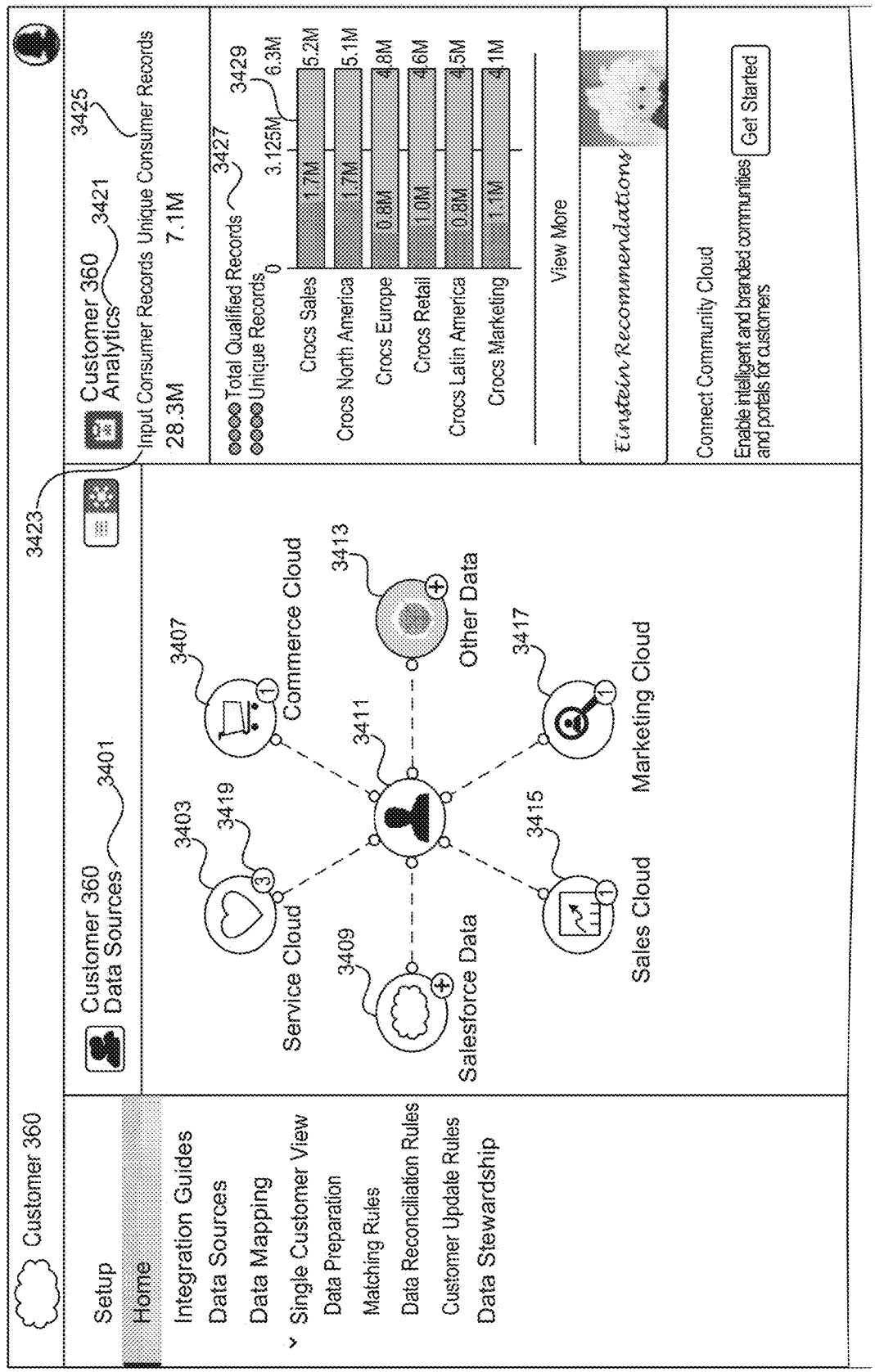
FIG. 34 illustrates a Commerce Architecture GUI screenshot of the connection between data sources and the system, according to some embodiments.

FIG. 34 illustrates a Commerce Architecture GUI screenshot of the connection between data sources and the system, according to some embodiments. After finishing the process of setting up Commerce Architecture, the home screen of the GUI will show the data sources connected to the system, as in FIG. 34. For example, Data Sources 3401 includes Service Cloud 3403, Commerce Cloud 3407, Sales Cloud 3415, and Marketing Cloud 3417, all connected to system 3411. The numbers at the bottom right of each cloud can indicate the number of data sources in the cloud, such as number three 3419 for service cloud, which means three service cloud data sources are connected. The user can add more data sources from Salesforce by clicking on Salesforce Data 3409, or more data sources from third party by clicking on Other Data 3413. One the right side of the GUI, Analytics 3421 of the connected data provide Input Consumer Records 3423 and Unique Consumer Records 3425. For example, in FIG. 34, the Input Consumer Records are 28.3 M, and Unique Consumer Records are 7.1 M. And the Total Qualified Records and Unique Records for each data source is shown in chart 3429, with legend 3427 for different records and different clouds.

Third Party Data Sources

Third Party Data Sources are databases and systems that belong to third parties such as an Enterprise Resource Planning (ERP) system. For example, a customer such as Crocs, has data that can be used by the embodiments herein to provide service such as event data analysis or generate marketing mails for consumers. Conventionally a customer would have to use a system-specific Application Programming Interface (API) and program specific codes to connect with third party data sources. Embodiments presented herein allow the customer, as the user or administrator, to forgo use of the distinct APIs and codes, and provides a singular, unified, point-and-click API for queries across multiple disparate disconnected systems thereby significantly reducing time and cost required for such conversions.

Figure 35:
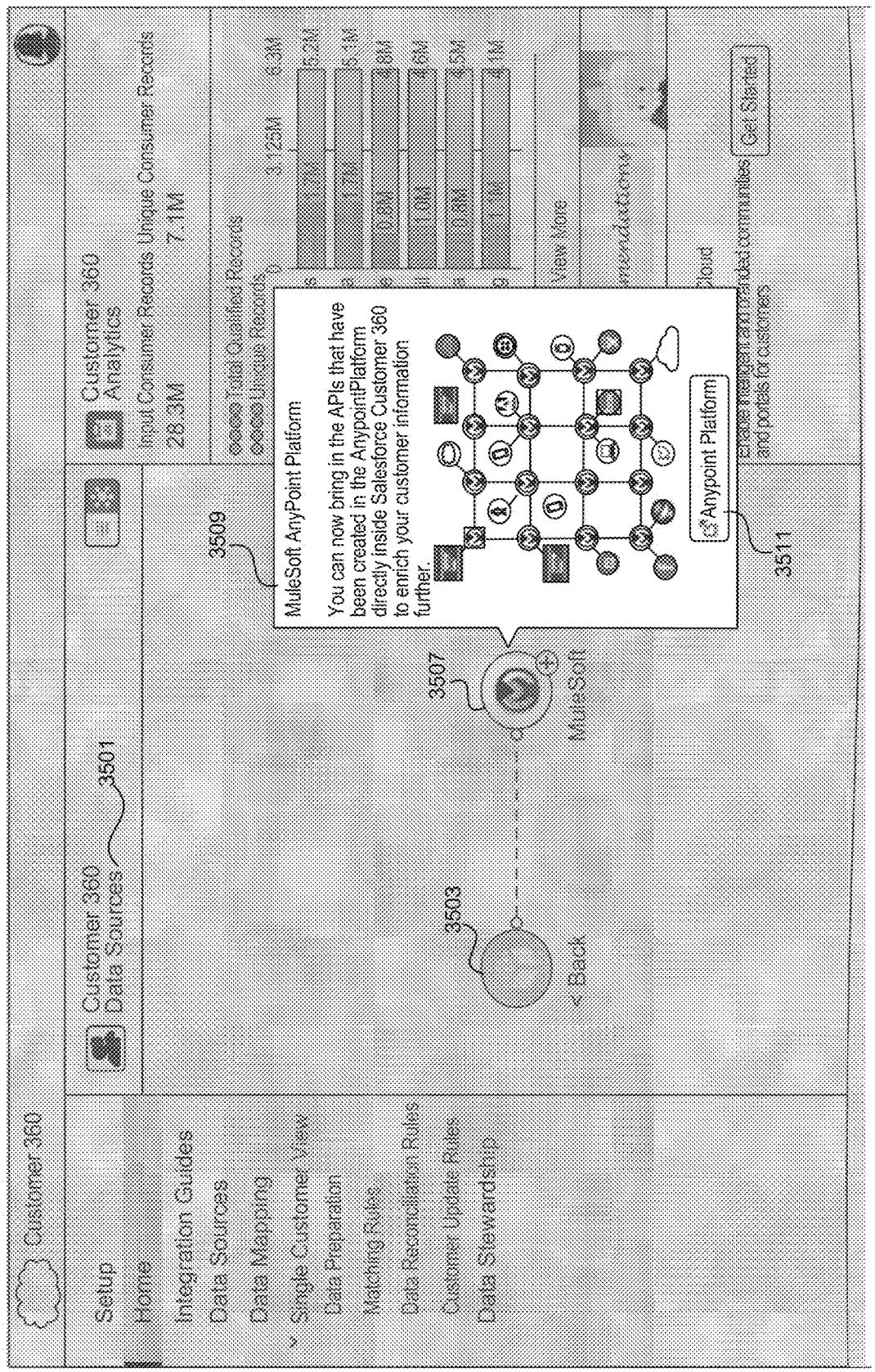
FIG. 35 illustrates a Commerce Architecture GUI screenshot of connecting exemplary third part data to the system, according to some embodiments.

FIG. 35 illustrates a Commerce Architecture GUI screenshot of connecting exemplary third part data to the system, according to some embodiments. In the example of FIG. 35, the GUI provides Data sources 3501 including MuleSoft 3507 after a user clicks on Other Data 3413 in FIG. 34. And clicking on MuleSoft 3507 will bring out a message box 3509 MuleSoft Anypoint Platform. APIs created in Anypoint Platform can be connected to the system to enrich customer information further. The user can click on Anypoint Platform 3511 to connect with more APIs, or click on Back 3503 to return to the home page of Data Sources as shown in FIG. 34.

Figure 36:
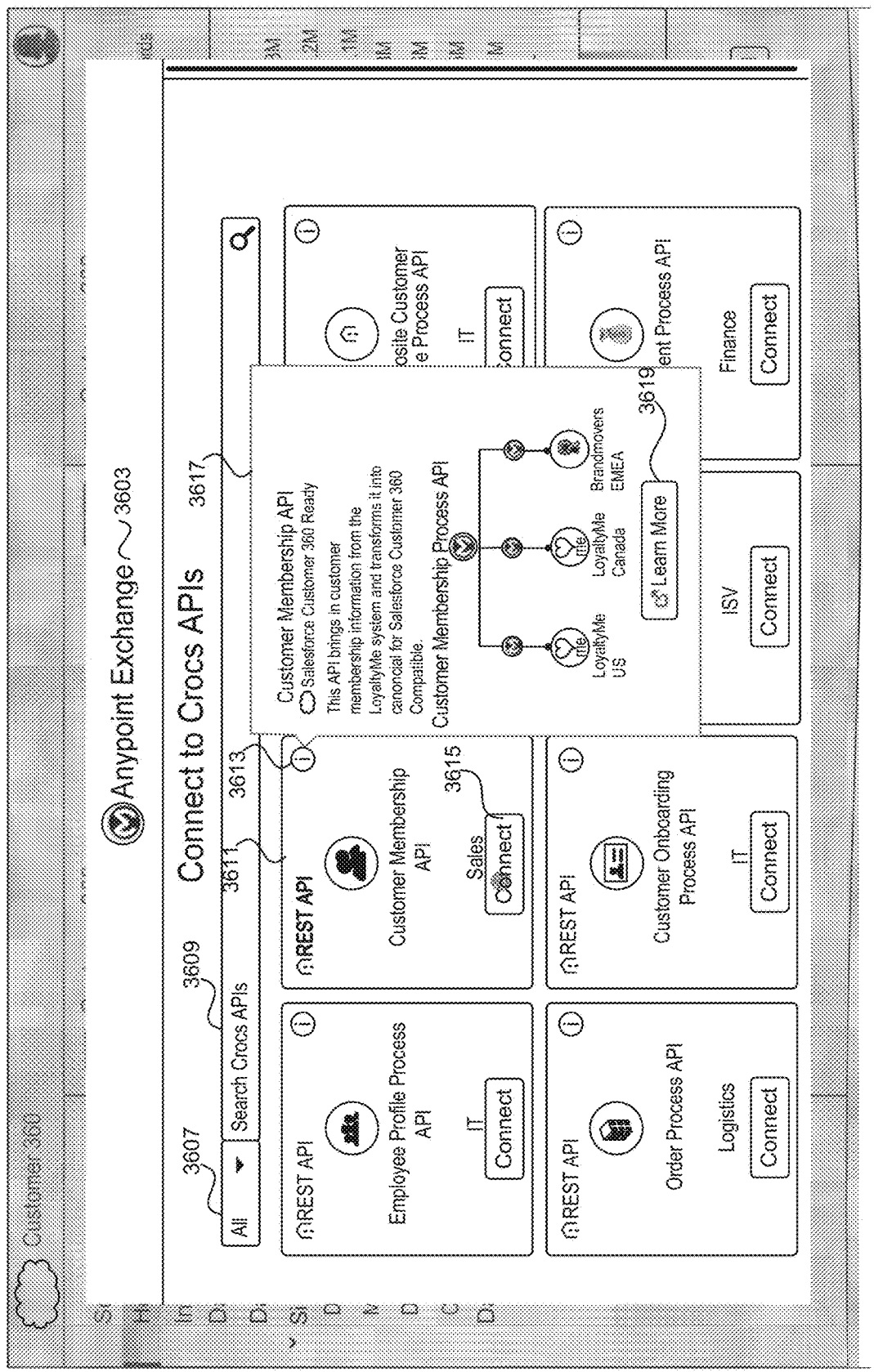
FIG. 36 illustrates a Commerce Architecture GUI screenshot of the details of adding exemplary third part data through API to the system, according to some embodiments.

FIG. 36 illustrates a Commerce Architecture GUI screenshot of the details of adding exemplary third part data through API to the system, according to some embodiments. In FIG. 36. Anypoint Exchange platform 3603 is shown in the GUI after clicking on Anypoint Platform. The user can choose for any category of API from dropdown menu 3607, and search for customer APIs in search box 3609. The customer APIs includes, for example, Employee Profile Process API, Customer membership API, and Customer Onboarding Process API. The user can get more information about the Customer Membership API 3611 by clicking on the information mark 3613 at the top right corner of API 3611. The pop-up message box 3617 introduces the basic function of Customer Membership API and the user can learn more details by clicking on Learn More 3619. After clicking on Connect 3615, Customer Membership API is connected with the system.

Figure 37:
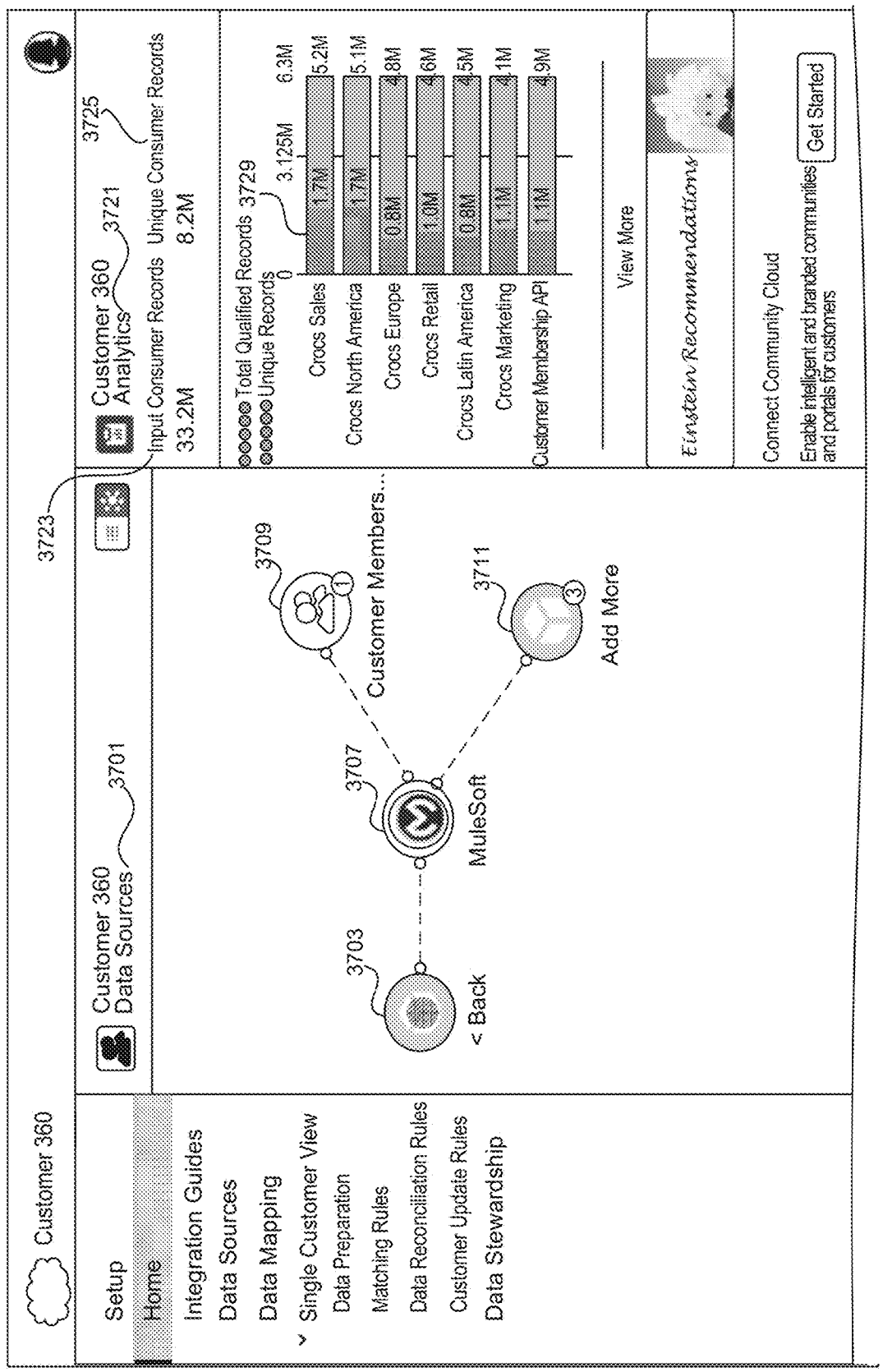
FIG. 37 illustrates a Commerce Architecture GUI screenshot of the connection of the third part data source and API, according to some embodiments.

FIG. 37 illustrates a Commerce Architecture GUI screenshot of the connection of the third part data source and API, according to some embodiments. After Customer Membership API is connected, Data Sources 3701 in FIG. 37 will update the connection of Customer Membership API 3709 with MuleSoft 3707. The user can click on Add More 3711 to add more third party APIs, or click on Back 3703 to the home page of Data Sources. Analytics 3721 will also be updated for Input Consumer Records 3723, Unique Consumer Records 3725, legend 3727 and analytics chart 3729.

Figure 38:
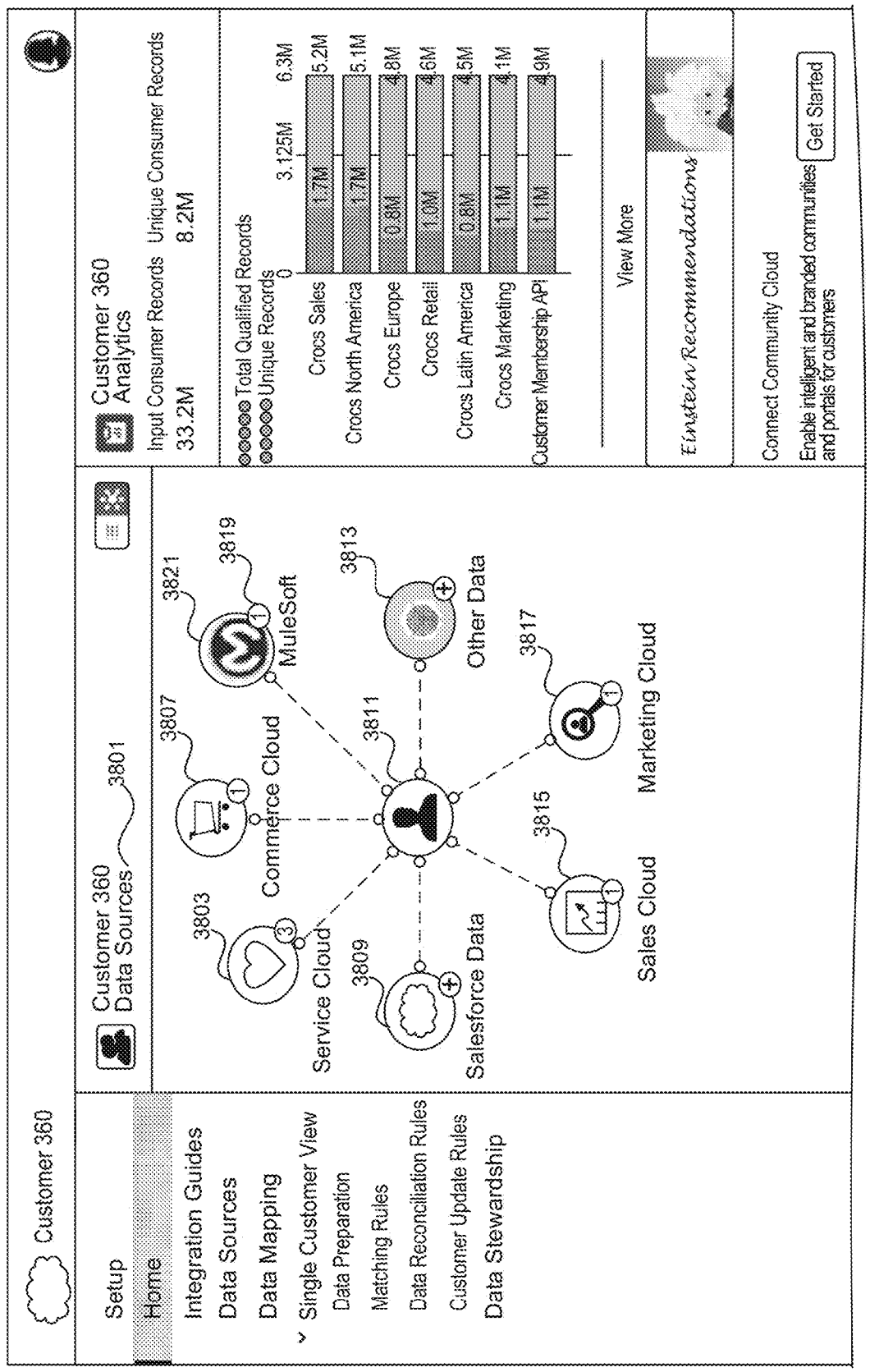
FIG. 38 illustrates a Commerce Architecture GUI screenshot of the connection between the system and the data sources including third part data source, according to some embodiments.

FIG. 38 illustrates a Commerce Architecture GUI screenshot of the connection between the system and the data sources including third part data source, according to some embodiments. As show in FIG. 38, after adding third party data source, Data Sources 3801 will include Service Cloud 3803, Commerce Cloud 3807, Sales Cloud 3815, marketing Cloud 3817, and MuleSoft third part data source 3821 with number one 3819 indicating on third party API connected. These data sources are connected with system 3811. The user can add more Salesforce data source by clicking on Salesforce Data 3809, or add more third part data source by clicking on Other Data 3813.

Commerce Architecture GUI Flowchart

Figure 39:
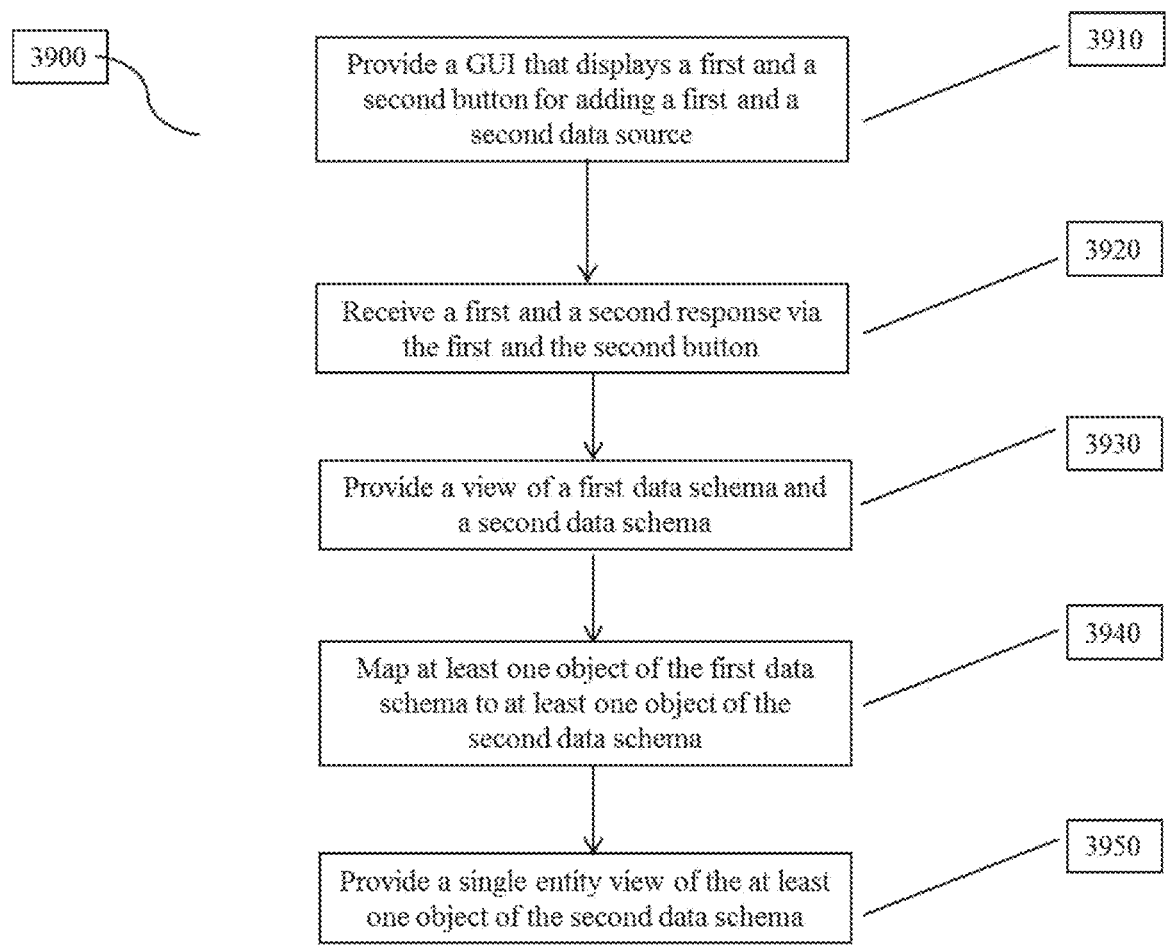
FIG. 39 illustrates a flowchart example for setting up Commerce Architecture GUI, according to some embodiments.

FIG. 39 illustrates a flowchart example for setting up Commerce Architecture GUI, according to some embodiments. Method 3900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 39, as will be understood by a person of ordinary skill in the art. Method 3900 shall be described with reference to FIG. 1-FIG. 38. However, method 3900 is not limited to the example embodiments.

At 3910, a Commerce Architecture GUI is provided to display a first and a second button for adding a first and a second data source. For example, the GUI in FIG. 1 includes Salesforce Data 101 and Other Data 102, which can be used to add a Salesforce data source, or a third party data source. The first and second buttons can also refer to different Salesforce clouds 211, 213, 217, or 219. The GUI provides point-and-click user interfaces to add data sources, instead of conventionally program codes and various APIs.

At 3920, a first and a second response is received via clicking on the first and the second button. As shown in FIG. 7, after adding Salesforce data sources, all the authenticated data sources are listed in the GUI.

At 3930, a view of a first data schema and a second data schema is provided in the Commerce Architecture GUI. For example, FIG. 8-FIG. 16 show the Data Source Schema as the first data schema on the left side, and Canonical Data Model as the second data schema on the right side. The Data Source Schema includes all the data of the connected data sources. And the Canonical Data Model can be a master record for the data of connected data sources.

At 3940, at least one object of the first data schema is mapped to at least one object of the second data schema. For example, in FIG. 10, the first object Birthday of the first data schema Data Source Schema is mapped to the second object Date of Birth of the second data schema Canonical Data Model.

At 3950, a single entity view of the second object of the second data schema is provided through Data Preparation, Matching Rules, Data Reconciliation Rules, and Customer Update Rules. FIG. 16-FIG. 27 shows the setup of a single entity view. During Data. Preparation, data quality can be enhanced to ensure the best customer profile consolidation. Different customer records related to the same customer can be identified by activating at least one of the mapping rules default values can be added for some data sources. And data reconciliation rule can be configured for any attribute that can only have one value. The reconciliation rules determine which value to use when there are multiple values available from different data sources.

Computer System Implementation

Figure 40:
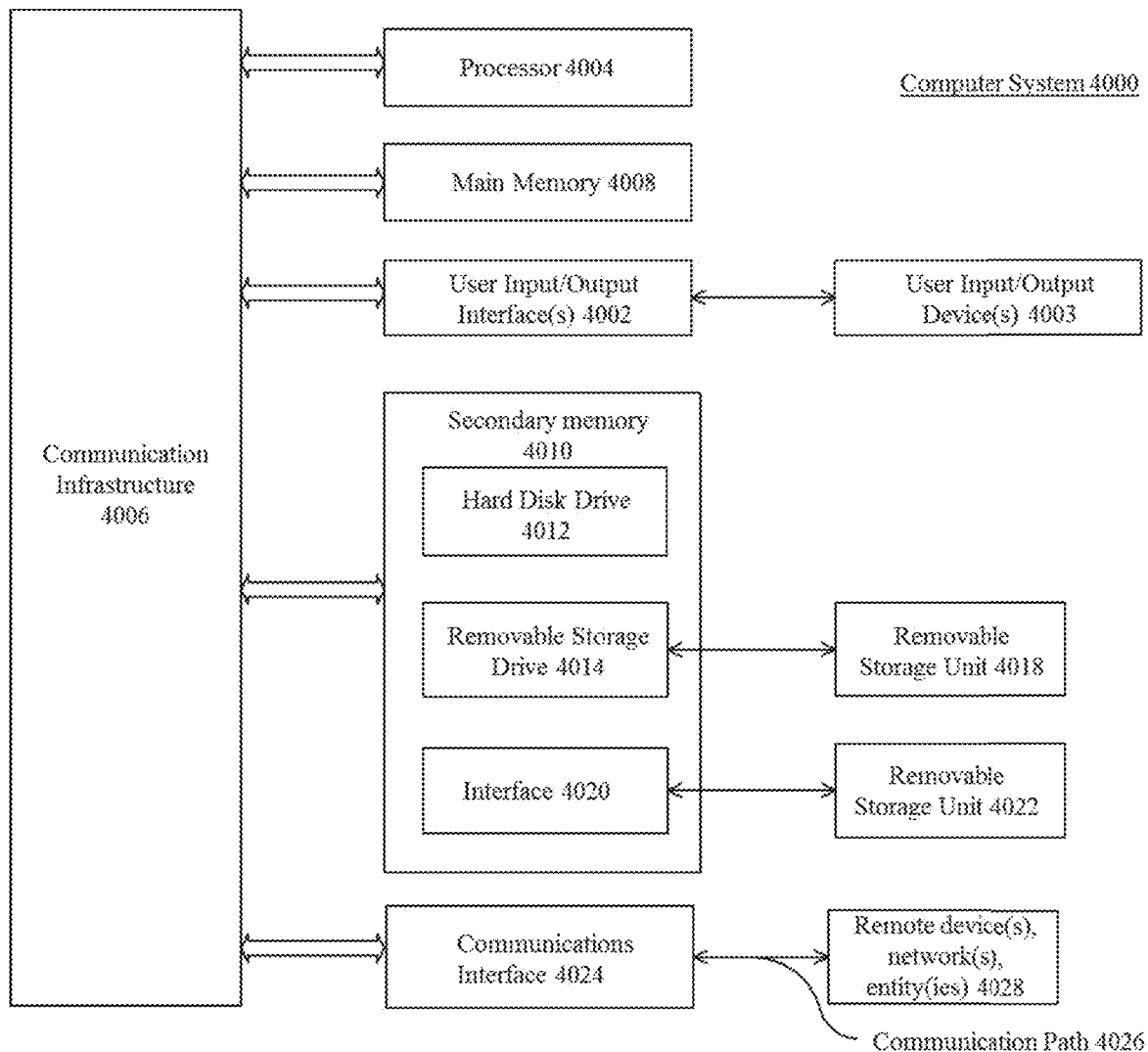
FIG. 40 illustrates an example computer system which may be used for implementing various embodiments presented herein.

FIG. 40 illustrates an example computer system which may be used for implementing various embodiments presented herein. Various embodiments shown in FIG. 1 FIG. 38 may be implemented using one or more well-known computer systems, such as computer system 4000 shown in FIG. 40. One or more computer systems 4000 may be used, for example, to implement any of the embodiments discussed herein, as well as combinations and sub-combinations thereof.

Computer system 4000 may include one or more processors (also called central processing units, or CPUs), such as a processor 4004. Processor 4004 may be connected to a communication infrastructure or bus 4006.

Computer system 4000 may also include user input/output device(s) 4003, such as monitors, keyboards, pointing devices, etc., which may communicate with communication infrastructure 4006 through user input/output interface(s) 4002.

One or more of processors 4004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 4000 may also include a main (or primary) memory 4008, such as random access memory (RAM). Main memory 4008 may include one or more levels of cache. Main memory 4008 may have stored therein control logic (i.e., computer software) and/or data.

Computer system 4000 may also include one or more secondary storage devices or memory 4010. Secondary memory 4010 may include, for example, a hard disk drive 4012 or a removable storage device or drive 4014. Removable storage drive 4014 may be a floppy disk drive, a magnetic tape drive, a compact disk drive, an optical storage device, tape backup device, or any other storage device/drive.

Removable storage drive 4014 may interact with a removable storage unit 4018. Removable storage unit 4018 may include a computer usable or readable storage device having stored thereon computer software (control logic) or data. Removable storage unit 4018 may be a floppy disk, magnetic tape, compact disk, DVD, optical storage disk, or any other computer data storage device. Removable storage drive 4014 may read from or write to removable storage unit 4018.

Secondary memory 4010 may include other means, devices, components, instrumentalities, or other approaches for allowing computer programs or other instructions or data to be accessed by computer system 4000. Such means, devices, components, instrumentalities, or other approaches may include, for example, a removable storage unit 4022 and an interface 4020. Examples of the removable storage unit 4022 and the interface 4020 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 4000 may further include a communications or network interface 4024. Communications interface 4024 may enable computer system 4000 to communicate and interact with any combination of external devices, external networks, external entities, etc. (individually and collectively referenced by reference number 4028). For example, communications interface 4024 may allow computer system 4000 to communicate with external or remote devices 4028 over communications path 4026, which may be wired or wireless (or a combination thereof), and which may include any combination of LANs, WANs, the Internet, etc. Control logic or data may be transmitted to and from computer system 4000 via communications path 4026.

Computer system 4000 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 4000 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 4000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), Message hack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 4000, main memory 4008, secondary memory 4010, and removable storage units 4018 and 4022, as well as tangible articles of manufacture embodying any combination of the foregoing. Such control logic, when executed by one or more data processing devices (such as computer system 4000), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 40. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
providing, by a computing device, a graphical user interface (GUI) comprising a first button for adding a first data source and a second button for adding a second data source, wherein the first and second data sources comprise customer records related to a common customer;
receiving, by the computing device, a first authentication permission from a user in response to adding the first data source via the first button and a second authentication permission from the user in response to adding the second data source via the second button;
providing, by the computing device, a view of a first data schema and a second data schema in the GUI, wherein the first data schema comprises at least one object displaying a first value indicating a first quantity of the customer records from the first or the second data source collapsed under the at least one object and wherein the second data schema is a canonical data model of the customer records;
mapping, by the computing device in the GUI with one or more visual logic connectors, the first quantity of the customer records in the first data schema to at least one object of the canonical data model of the customer records in the second data schema based on attribute definitions, wherein the one or more visual logic connectors display a mapping value indicating a second quantity of mapped customer records between the at least one object in the first data schema and the at least one object in the second data schema;
identifying, by the computing device in the GUI, an unmatched record in the first quantity of the customer records by a difference between the first value and the mapping value;
expanding, by the computing device in the GUI, the at least one object having the first quantity of the customer records to reveal the unmatched record; and
adding, by the computing device in the GUI, a new record corresponding to the unmatched record to the at least one object in the second data schema.

2. The method of claim 1, further comprising:
displaying, by the computing device, a second value on the at least one object of the canonical data model to indicate a second quantity of the customer records in the at least one object.

3. The method of claim 1, further comprising:
providing, by the computing device, a single entity view of the at least one object of the second data schema for the common customer, wherein the single entity view includes the customer records from the first and second data sources related to the common customer and the first and second data sources corresponding to the customer records.

4. The method of claim 3, wherein providing the single entity view comprises:
transforming the at least one object of the first data schema based on a plurality of formatting rules;
determining a match between the at least one object of the customer records in the first data schema and the at least one object of the canonical data model of the customer records in the second data schema based on a plurality of matching rules; and
updating the at least one object of the canonical data model of the customer records in the second data schema as a master record of the at least one object of the first data schema based on a plurality of updating rules.

5. The method of claim 1, further comprising:
managing, by the computing device in the GUI, the at least one object of the canonical data model of the customer records in the second data schema in response to a data management request.

6. The method of claim 5, wherein the data management request is submitted by a requestor to manage privacy information of the common customer.

7. The method of claim 5, wherein the data management request is submitted by a requestor to merge two customer records related to the common customer in the canonical data model into a single profile of the common customer.

8. The method of claim 1, further comprising providing, by the computing device, a third button to add a third party data source related to the common customer.

9. The method of claim 8, further comprising adding the third part data source through an application program interface (API).

10. The method of claim 1, further comprising:
displaying, by the computing device in the GUI, a mapping of a category of data sources to the common customer, wherein the category visually displaying a quantity of data sources in the category.

11. The method of claim 1, further comprising:
displaying, by the computing device, a quantity of total customer records added from the first and the second data sources and a quantity of unique customer records for the canonical data model of the customer records.

12. The method of claim 1, further comprising:
displaying, by the computing device, a plurality of records in response to a search request, wherein each of the plurality of records displays a corresponding data source.

13. A system, comprising:
a memory; and
at least one processor coupled to the memory, wherein the at least one processor is configured to:
provide a graphical user interface (GUI) comprising a first button for adding a first data source and a second button for adding a second data source, wherein the first and second data sources comprise customer records related to a common customer;
receive a first authentication permission from a user in response to adding the first data source via the first button and a second authentication permission from the user in response to adding the second data source via the second button;
provide a view of a first data schema and a second data schema in the GUI, wherein the first data schema comprises at least one object displaying a first value indicating a first quantity of the customer records from the first or the second data source collapsed under the at least one object and wherein the second data schema is a canonical data model of the customer records;
map, in the GUI with one or more visual logic connectors, first quantity of the customer records in the first data schema to at least one object of the canonical data model of the customer records in the second data schema based on attribute definitions, wherein the one or more visual logic connectors display a mapping value indicating a second quantity of mapped customer records between the at least one object in the first data schema and the at least one object in the second data schema;
identify, in the GUI, an unmatched record in the first quantity of the customer records by a difference between the first value and the mapping value;
expand, in the GUI, the at least one object having the first quantity of the customer records to reveal the unmatched record; and
add, in the GUI, a new record corresponding to the unmatched record to the at least one object in the second data schema.

14. The system of claim 13, wherein the at least one processor is further configured to:
provide a single entity view of the at least one object of the second data schema for the common customer, wherein the single entity view includes the customer records from the first and second data sources related to the common customer and the first and second data sources corresponding to the customer records.

15. The system of claim 14, wherein to provide the single entity view, the at least one processor is configured to:
transform the at least one object of the first data schema based on a plurality of formatting rules;
determine a match between the at least one object of the customer records in the first data schema and the at least one object of the canonical data model of the customer records in the second data schema based on a plurality of matching rules; and
update the at least one object of the canonical data model of the customer records in the second data schema as a master record the at least one object of the first data schema based on a plurality of updating rules.

16. The system of claim 13, wherein the at least one processor is further configured to:
manage, in the GUI, the at least one object of the canonical data model of the customer records in the second data schema in response to a data management request.

17. The system of claim 13, wherein the at least one processor is further configured to provide a third button to add a third party data source related to the common customer.

18. The system of claim 17, wherein the at least one processor is further configured to add the third party data source through an application program interface (API).

19. A tangible non-transitory computer-readable device having instructions stored thereon that, when executed by a computing device, causes the computing device to perform operations comprising:
providing a graphical user interface (GUI) comprising a first button for adding a first data source and a second button for adding a second data source, wherein the first and second data sources comprise customer records related to a common customer;
receiving a first authentication permission from a user in response to adding the first data source via the first button and a second authentication permission from the user in response to adding the second data source via the second button;
providing a view of a first data schema and a second data schema in the GUI, wherein the first data schema comprises at least one object displaying a first value indicating a first quantity of the customer records from the first or the second data source collapsed under the at least one object, and wherein the second data schema is a canonical data model of the customer records;
mapping, in the GUI with one or more visual logic connector connectors, the first quantity of the customer records in the first data schema to at least one object of the canonical data model of the customer records in the second data schema based on attribute definitions, wherein the one or more visual logic connectors display a mapping value indicating a second quantity of mapped customer records between the at least one object in the first data schema and the at least one object in the second data schema;
identifying, in the GUI, an unmatched record in the first quantity of the customer records by a difference between the first value and the mapping value;
expanding, in the GUI, the at least one object having the first quantity of the customer records to reveal the unmatched record; and
adding, in the GUI, a new record corresponding to the unmatched record to the at least one object in the second data schema.

20. The tangible non-transitory computer-readable device of claim 19, the operations further comprising:
providing a single entity view of the at least one object of the second data schema for the common customer, wherein the single entity view includes the customer records from the first and second data sources related to the common customer and the first and second data sources corresponding to the customer records.

21. The tangible non-transitory computer-readable device of claim 19, wherein providing the single entity view comprises:
transforming the at least one object of the first data schema based on a plurality of formatting rules;
determining a match between the at least one object of the customer records in the first data schema and the at least one object of the canonical data model of the customer records in the second data schema based on a plurality of matching rules; and
updating the at least one object of the canonical data model of the customer records in the second data schema as a master record of the at least one object of the first data schema based on a plurality of updating rules.

22. The tangible non-transitory computer-readable device of claim 19, the operations further comprising:
managing, in the GUI, the at least one object of the canonical data model of the customer records in the second data schema in response to a data management request.

23. The tangible non-transitory computer-readable device of claim 19, the operations further comprising providing a third button to add a third party data source related to the common customer.

* * * * *